US011345577B2

(12) United States Patent
Holwell et al.

(10) Patent No.: US 11,345,577 B2
(45) Date of Patent: May 31, 2022

(54) MOBILE AUTOMATED GUIDED VEHICLE PALLET STACKER AND DESTACKER SYSTEM AND METHOD THEREFOR

(71) Applicant: Autoguide LLC, Chelmsford, MA (US)

(72) Inventors: Justin Holwell, Princeton, MA (US); David Levasseur, Billerica, MA (US); Tyler Barron, Chelmsford, MA (US)

(73) Assignee: Teradyne, Inc., Chelmsford, MA (US)

( * ) Notice: Subject to any disclaimer, the term of this patent is extended or adjusted under 35 U.S.C. 154(b) by 0 days.

(21) Appl. No.: 17/083,967

(22) Filed: Oct. 29, 2020

(65) Prior Publication Data
US 2021/0141368 A1    May 13, 2021

Related U.S. Application Data

(60) Provisional application No. 62/929,500, filed on Nov. 1, 2019.

(51) Int. Cl.
| B66F 9/075 | (2006.01) |
| B66F 9/06 | (2006.01) |
| G05D 1/00 | (2006.01) |
| G05B 19/418 | (2006.01) |
| B65D 19/38 | (2006.01) |
| G05D 1/02 | (2020.01) |

(52) U.S. Cl.
CPC ............ B66F 9/063 (2013.01); B65D 19/385 (2013.01); B66F 9/0755 (2013.01); G05B 19/41895 (2013.01); G05D 1/0088 (2013.01); G05D 1/0212 (2013.01); G05D 2201/0216 (2013.01)

(58) Field of Classification Search
CPC .............................. B66F 9/063; B66F 9/0755
See application file for complete search history.

(56) References Cited

U.S. PATENT DOCUMENTS

| 10,138,101 | B2* | 11/2018 | Svensson | ............. B66F 9/0755 |
| 2003/0089771 | A1* | 5/2003 | Cybulski | ............... B65D 19/00 235/385 |
| 2004/0083025 | A1* | 4/2004 | Yamanouchi | ......... B66F 9/0755 700/213 |

(Continued)

OTHER PUBLICATIONS

International Search Report and Written Opinion, International Application No. PCT/US2020/058291, dated Feb. 2, 2021.

*Primary Examiner* — Thomas Randazzo
(74) *Attorney, Agent, or Firm* — Perman & Green, LLP

(57) ABSTRACT

A mobile automated guided vehicle pallet stacker and destacker system including an automated guided vehicle having a pallet pick that moves to pick a pallet and stably hold the picked pallet on the pick. A sensor is connected to the vehicle and configured to detect a predetermined characteristic of at least one pallet located in a stack of one or more pallets. A sensing element of the sensor is mounted to the vehicle so as to define a predetermined relation between the sensing element and a pallet pick interface. Actuation of the pick effects scanning of the stack and detection, with the sensing element, of the predetermined characteristic. A controller determines from the predetermined characteristic the at least one pallet is in a topmost pallet position of the stack, and positions the pallet pick interface of the pick to interface the stack based on the determined topmost pallet position.

31 Claims, 19 Drawing Sheets

(56) References Cited

U.S. PATENT DOCUMENTS

| | | | |
|---|---|---|---|
| 2004/0098146 A1* | 5/2004 | Katae | B66F 9/24 |
| | | | 340/429 |
| 2011/0095871 A1* | 4/2011 | Kail | H04Q 9/00 |
| | | | 340/10.6 |
| 2014/0074341 A1* | 3/2014 | Weiss | B66F 9/0755 |
| | | | 701/25 |
| 2014/0074342 A1* | 3/2014 | Wong | G05D 1/021 |
| | | | 701/26 |
| 2014/0277691 A1* | 9/2014 | Jacobus | G06Q 10/087 |
| | | | 700/216 |
| 2016/0090284 A1 | 3/2016 | Svensson et al. | |
| 2017/0316253 A1 | 11/2017 | Phillips et al. | |
| 2018/0089517 A1 | 3/2018 | Douglas et al. | |
| 2018/0089616 A1* | 3/2018 | Jacobus | B66F 9/0755 |
| 2019/0119085 A1 | 4/2019 | Pautz et al. | |

\* cited by examiner

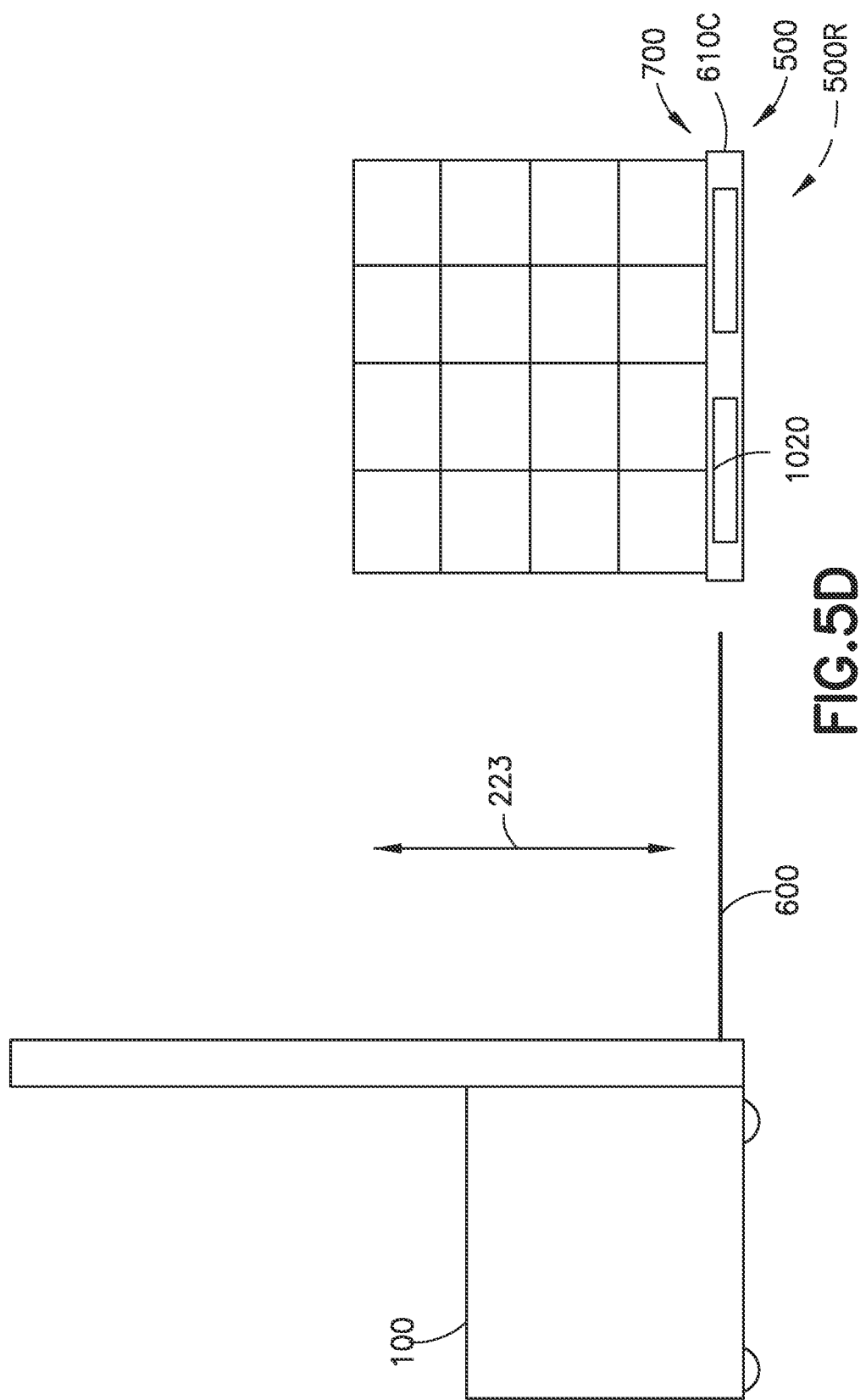

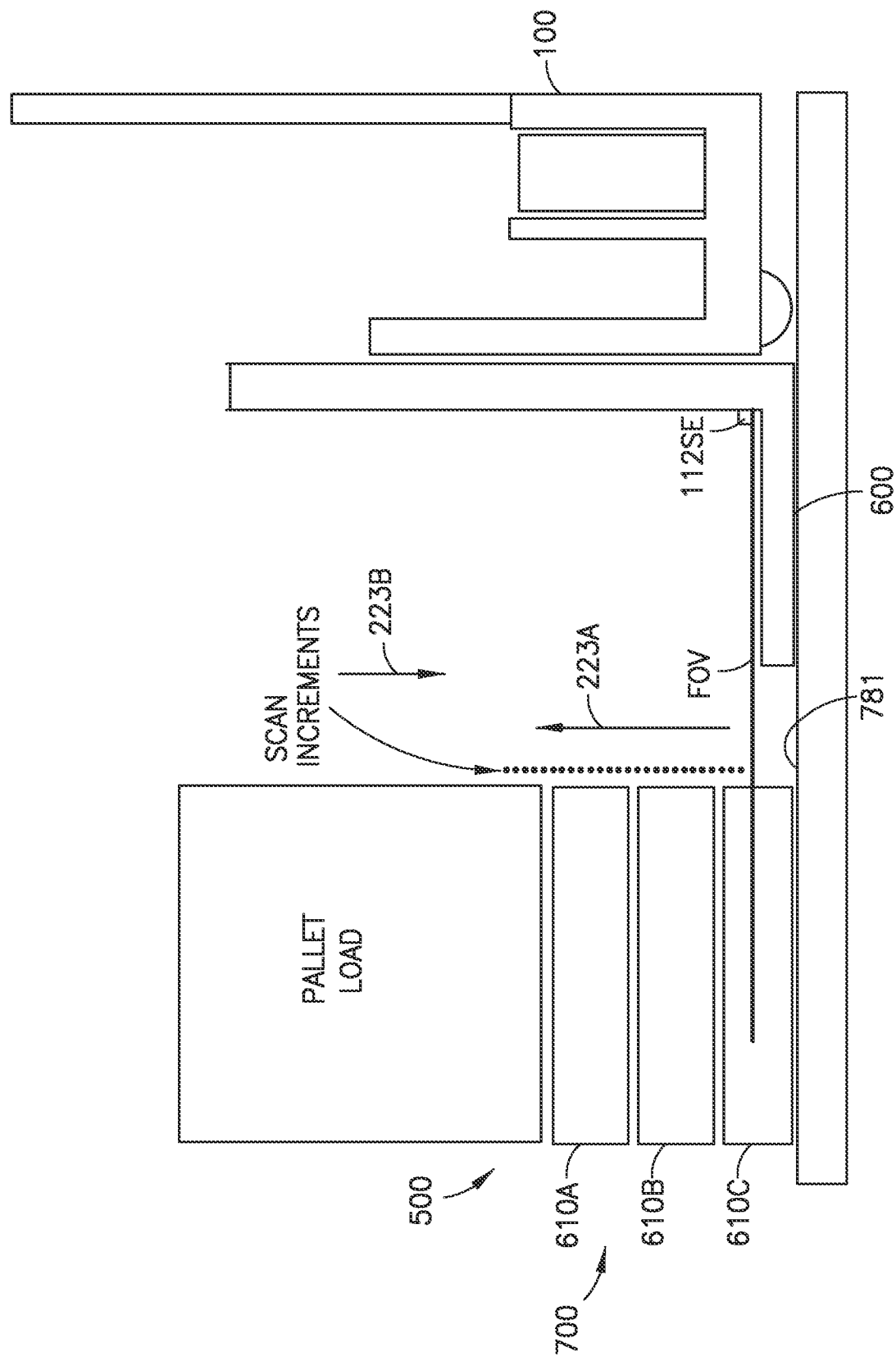

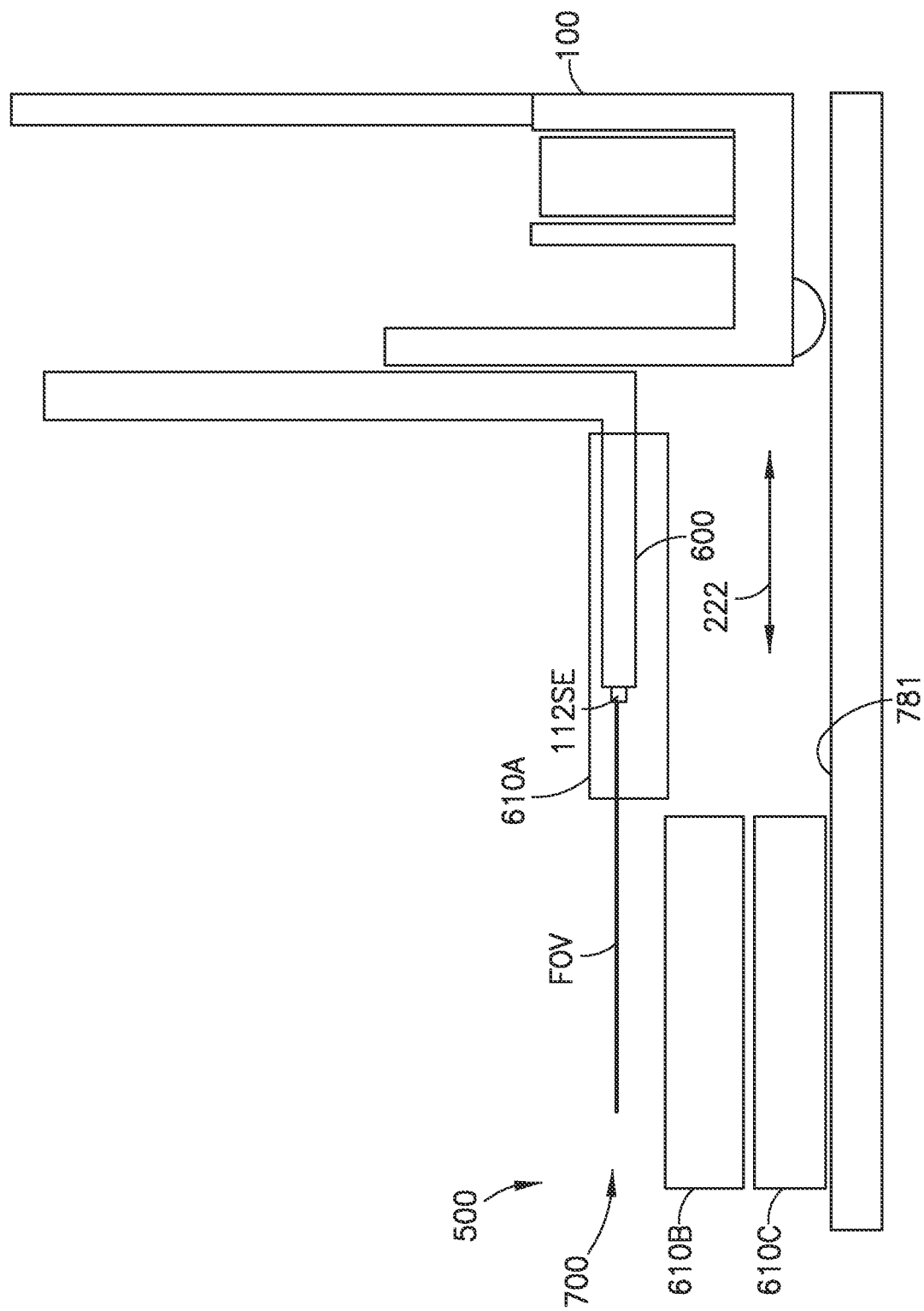

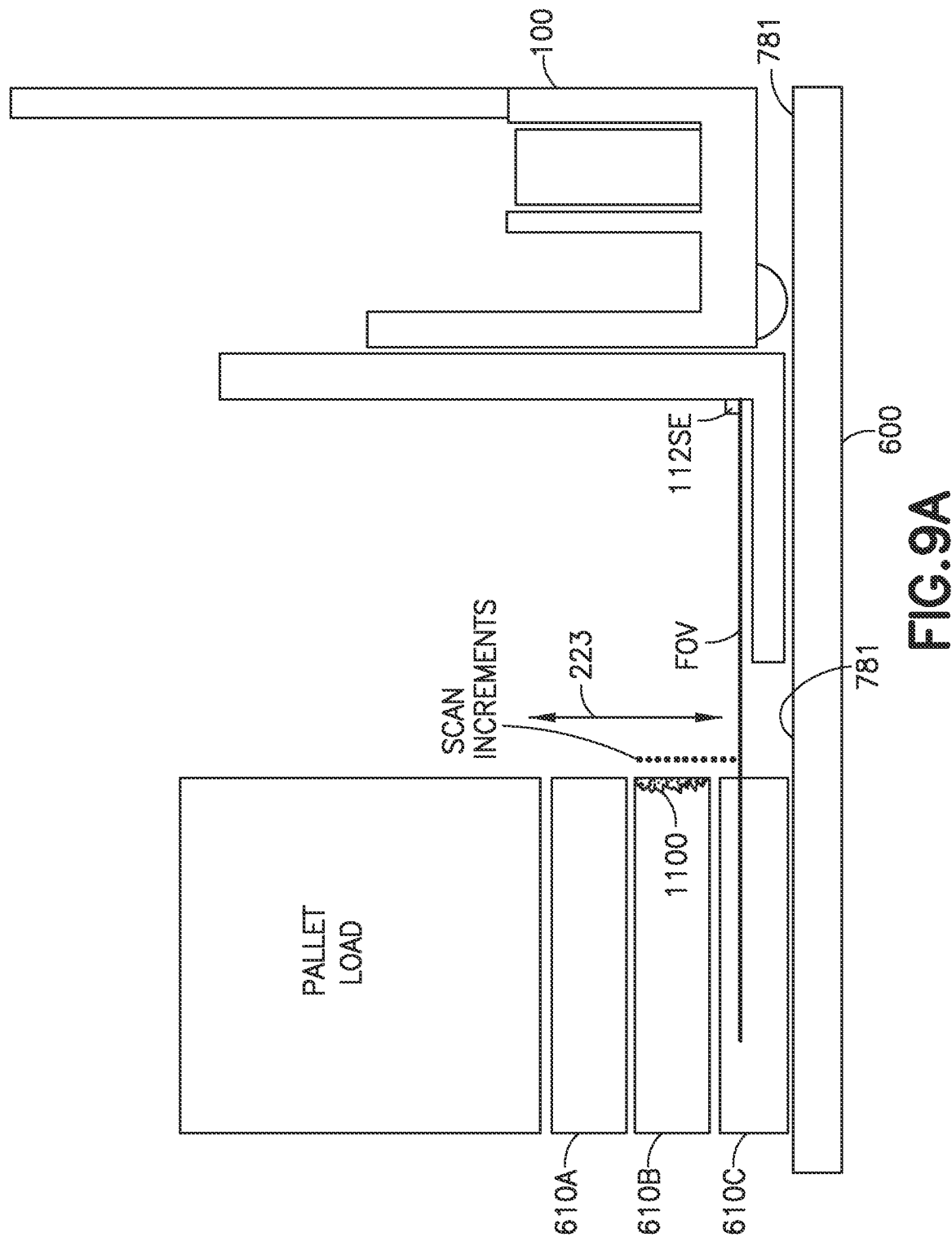

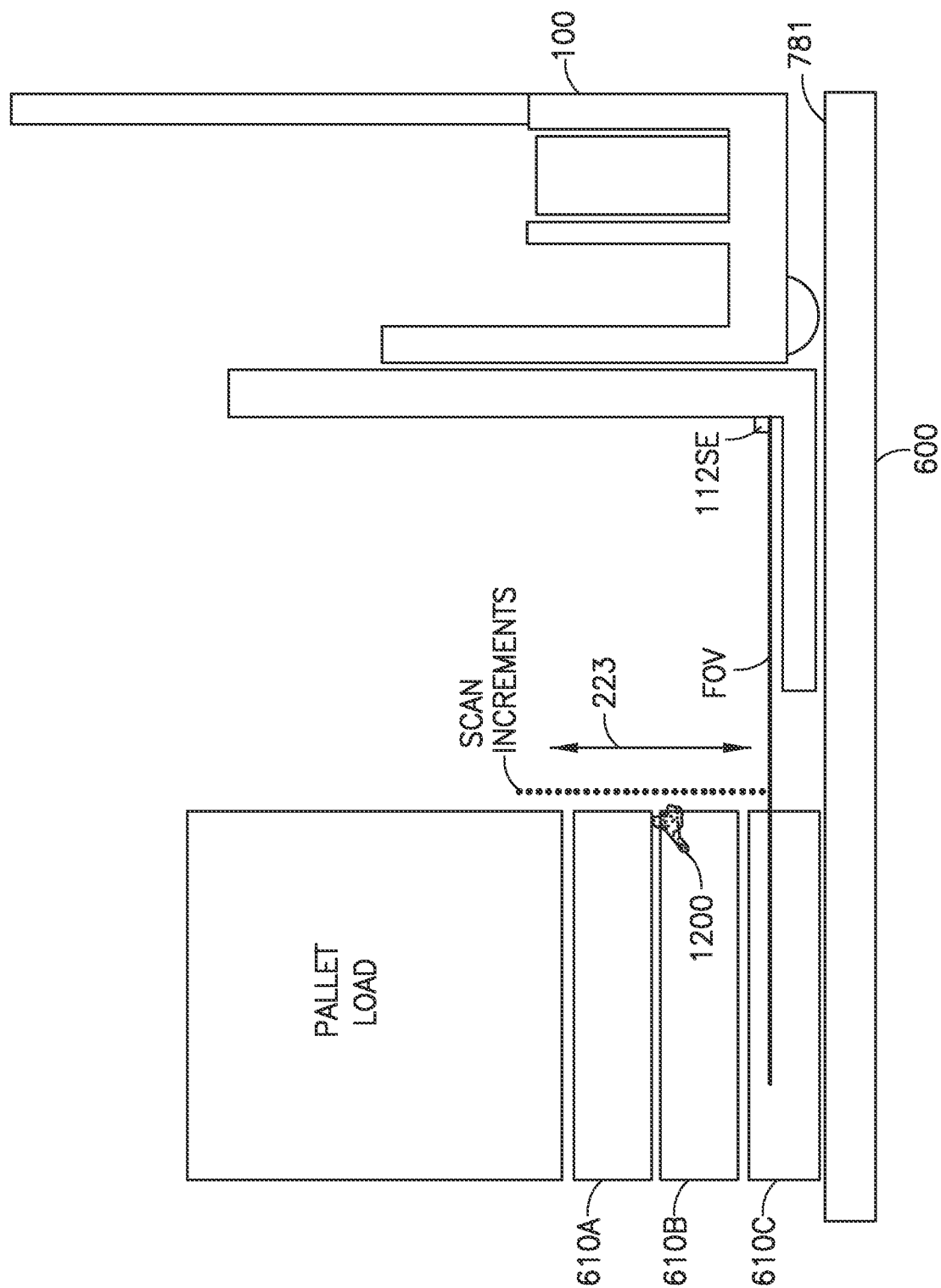

MOBILE AUTOMATED GUIDED VEHICLE PALLET STACKER AND DESTACKER SYSTEM AND METHOD THEREFOR

CROSS REFERENCE TO RELATED APPLICATIONS

This application claims the benefit of U.S. Provisional Patent Application No. 62/929,500, filed on Nov. 1, 2019, the disclosure of which is incorporated herein by reference in its entirety.

BACKGROUND

1. Field

The exemplary embodiments generally relate to logistics and material handling in a commercial logistic facility and, more particularly, to automated logistics and material handling.

2. Brief Description of Related Developments

Generally pallets, in commercial logistic facilities, are stacked one on top of the other at palletizing stations. Goods are placed on the top most pallet in the stack of pallets to commission (i.e., form) a pallet load. On the other hand, pallet loads may be placed on empty pallets at the palletizing station so that goods are removed from the pallets to decommission (i.e., remove items from) the pallet load. The pallets are transported by forklift trucks that are generally operated by human operators.

BRIEF DESCRIPTION OF THE DRAWINGS

The foregoing aspects and other features of the disclosed embodiment are explained in the following description, taken in connection with the accompanying drawings, wherein:

FIGS. 5B-5D illustrate an exemplary sequence for destacking of pallets in accordance with aspects of the disclosed embodiment;

FIGS. 7A-7C illustrate an exemplary sequence for destacking of pallets from a stack of one or more pallets in accordance with aspects of the disclosed embodiment;

FIG. 7D illustrates placement of a pallets onto a stack of one or more pallets in accordance with aspects of the disclosed embodiment;

FIGS. 9A and 9B are exemplary illustrations of pallet stack scanning where a pallet in a stack of one or more pallets includes an pick obstruction in accordance with aspects of the disclosed embodiment;

DETAILED DESCRIPTION

It would be advantageous to have an autonomous guided vehicle that is configured to transport pallets (e.g., empty pallets or pallet loads) to and from stacks of pallets at a pallet holding station (e.g., at a palletizing/depalletizing station or other location where pallets are stacked).

Figure 1:
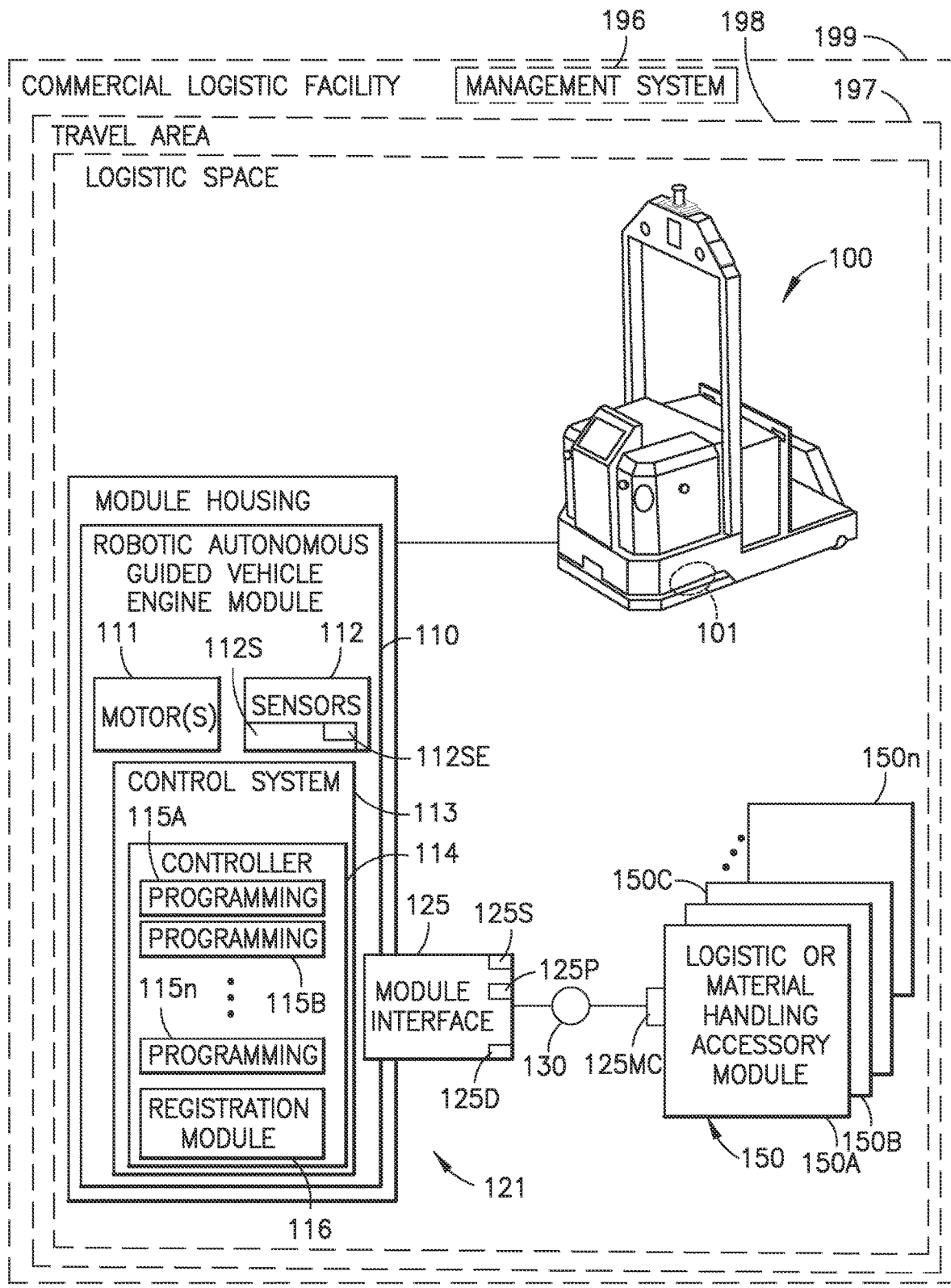
FIG. 1 is a perspective illustration of commercial logistics facility including a configurable modular robotic autonomous guided vehicle in accordance with aspects of the disclosed embodiment.

Referring to FIG. 1, a robotic autonomous guided vehicle 100 (also referred to herein as "autonomous guided vehicle", "mobile automated guided vehicle", or "mobile automated guided palletizer/depalletizer vehicle") is illustrated in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The autonomous guided vehicle 100 is configured for logistic and/or material handling in a commercial logistic facility 199. Examples of the commercial logistic facility 199 include, but are not limited to, warehouses, stores, storage and retrieval facilities, distribution facilities, and production/assembly facilities. Suitable examples of the autonomous guided vehicle 100 are described in, for example, U.S. patent application Ser. No. 16/586,040 filed on Sep. 27, 2019 and titled "Commercial Logistic Facility, Configurable Modular Robotic Autonomous Guided Vehicle, and Method Therefor" and in U.S. patent application Ser. No. 16/585,935 filed on Sep. 27, 2019 and titled "A Collaborative Automation Logistics Facility", the disclosures or which are incorporated herein by reference in their entireties. Another suitable example of the autonomous guided vehicle 100 includes the MAX N10 mobile robot platform available from AutoGuide LLC, though any suitable autonomous guided vehicle may be used.

In one aspect, such as where the autonomous guided vehicle 100 operates in a production/assembly facility (the production/assembly facility is used here for exemplary purposes only and it should be understood that the autonomous guided vehicle 100 may perform any suitable transport of goods depending on the facility in which the autonomous guided vehicle 100 operates), the autonomous guided vehicle may traverse a travel area 198 in the production/assembly facility to transport objects from/to or between different fabrication zones in the production/assembly facility where each different fabrication zone has a different stage of goods fabrication, e.g., a subassembly from one fabrication stage is transferred to another fabrication stage for integration into a larger assembly/subassembly (such as in vehicle manufacturing). In another aspect, the autonomous guided vehicle 100 may transfer the goods to a final assembly fabrication zone or to a shipping area for outbound transfer of the goods from the production/assembly facility. In still other aspects, the autonomous guided vehicle 100 is configured as a pallet stacker and destacker that stacks and destacks pallets at any suitable location including but not limited to palletizing/depalletizing stations or any other suitable pallet holding area/location of the commercial logistic facility 199 in/at which pallets are stacked one on top of the other.

The autonomous guided vehicle 100 includes a robotic autonomous guided vehicle engine module or vehicle base 110. The robotic autonomous guided vehicle engine module 110 includes motor(s) 111, sensors 112, and a control system 113 that are integrated with each other for autonomous navigation of the autonomous guided vehicle 100, freely throughout the travel area 198 of the commercial logistic facility 199. In one aspect, the travel area 198 forms a logistic space 197 of the commercial logistic facility 199; while in other aspects the travel area 198 forms any suitable space of the commercial logistic facility 199. The motor(s) 111 may be any suitable motors configured to drive one or more wheels or tracks 101 of the automated guided vehicle 100, either directly or through any suitable transmission, so that the automated guided vehicle 100 traverses, e.g., a floor, or any other suitable autonomous guided vehicle support surface, of the travel area 198.

The sensors 112 may be any suitable sensors that are disposed at any suitable locations on the robotic autonomous guided vehicle engine module 110 to effect autonomous navigation of the autonomous guided vehicle 100 throughout the travel area 198. The sensors 112 include, but are not limited to, one or more of optical sensors, acoustic sensors, capacitive sensors, radio-frequency sensors, cameras having large fields of view, time of flight cameras, proximity imaging sensors/cameras, and/or any other suitable sensor(s) that provide(s) for the dynamic detection of obstacles, goods, personnel, docking stations, close coupling between the autonomous guided vehicle 100 (and its payload and/or accessory module) with manufacturing equipment, etc., and/or simultaneous localization and mapping (SLAM) (or other suitable navigation technique) within the commercial logistic facility 199.

Referring to FIGS. 1, 2, 7A-7C, 9A, and 9B, the sensors 112 may also include any suitable sensors 112S that are communicably connected to the robotic autonomous guided vehicle engine module 110 in any suitable manner. The sensors 112S are configured to detect a predetermined characteristic of at least one pallet 610A-610C located in a stack (or column) 500 of one or more pallets (i.e., a pallet stack) (see FIGS. 5A-5C noting that while three pallets are illustrated any suitable number of pallets may be stacked one on top of the other in the pallet stack 500). In one aspect, the predetermined characteristic is determinative of a seat interface 1020 (FIG. 10) of the at least one pallet 610A-610C that is engaged by the autonomous guided vehicle 100 for picking the at least one pallet 610A-610C.

In one aspect, the predetermined characteristic may include any suitable characteristic of the at least one pallet 610A-610C that facilitates the determination of a location of the at least one pallet 610A-610C in the pallet stack 500 and effects picking/placing the at least one pallet 610A-610C from/to the pallet stack 500. For example, the predetermined characteristic may include, but is not limited to, a pallet top surface 1000, a pallet bottom surface 1010, a pallet pick pocket 1001, a seat surface 1020, an obstruction 1100, 1200 within the pallet pick pocket 1001, etc. (see FIGS. 10-12).

It is noted that the pallet stack 500 from which pallets are to be placed or picked is predetermined by at least the controller 14 and, in one aspect, is disposed at a dynamically variable location on the at least part of a facility surface 781 of the commercial logistic facility 199; although in other aspects the location of the pallet stack 500 may be substantially fixed (e.g., pallets are stacked in substantially the same location on the facility surface 781 each time the pallet stack is formed, such as at a palletizing/depalletizing station or other suitable location). For example, the pallet stack 500 is located in a predetermined location that is known by the controller 14 or communicated to the controller 14 by, for example, the management system 196 or other suitable input device connected to the autonomous guided vehicle 100. As described above, the predetermined location may be a variable location (e.g., the location of the pallet stack or area in which the pallet stack is formed may move from one location to another) within the commercial logistic facility 199 or a fixed/stationary location (e.g., the location of the pallet stack or area in which the pallet stack is formed does not move) within the commercial logistic facility 199.

The sensors 112S include at least one sensing element 112SE that is mounted to the autonomous guided vehicle 100 so as to define a predetermined (spatial) relation between the at least one sensing element 112SE and a pallet pick interface 600INT (FIG. 3) of a movable pallet pick 600 of the autonomous guided vehicle 100. For example, a distance between the pallet pick interface 600INT and each of the at least one sensing element 112SE in the pick direction 223 is known to, e.g. the controller 114, and the pallet pick interface 600INT can be positioned in the pick direction 223 based on scan data obtained by the at least one sensing element 112SE.

The at least one sensing element 112SE is disposed in the predetermined relation so that actuation of the pallet pick 600 in a pick direction 223 effects scanning of the pallet stack 500 and detection, with the at least one sensing element 112SE, of the predetermined characteristic of the at least one pallet 610A-610C in the pallet stack 500, as described in greater detail below. In one aspect, the at least one sensing element 112SE is mounted to the pallet pick 600. In one aspect, the at least one sensing element 112SE is disposed so as to move in the pick direction 223 coincident with motion of the pallet pick 600 in the pick direction 223, and detect the predetermined characteristic of the at least one pallet 610A-610C in the pallet stack 500 independent of whether the pallet pick 600 holds the at least one pallet 610A-610C thereon (see FIGS. 2 and 7D where the at least one sensing element 112SE is coupled to an end or tip of the pallet pick 600 or in any other suitable location of the movable pallet pick 60 so that a field of view FOV, FOV1 (FIG. 7C) is unobstructed by the at least one pallet 610A-610C and/or a pallet load held thereon). In one aspect, the pallet pick 600 comprises two forks (see FIG. 3) and the at last one sensing element 112SE is disposed between the two forks.

The at least one sensing element 112S comprises one or more of, but is not limited to, a two-dimensional LIDAR (light detection and ranging) sensor, a three-dimensional LIDAR sensor, an RGB camera (CMOS or complementary metal oxide semiconductor sensor, CCD charge-coupled device sensor, etc.), a depth camera, a time-of-flight camera, stereo cameras or sets of cameras to effect at least binocular vision, etc.

The control system 113 is any suitable control system having at least one controller 114 that is configured with any suitable programming for effecting operation of the autonomous guided vehicle 100 as described herein. The controller 114 may also be configured, such as through wireless communications, to communicate with any suitable management system 196 of the commercial logistic facility 199 to effect fully autonomous operation of the autonomous guided vehicle 100. For example, the autonomous guided vehicle 100 is configured to receive, and the management system 196 of the commercial logistic facility 199 is configured to send, commands that instruct the autonomous guided vehicle 100 to perform predetermined tasks within the commercial logistic facility 199. Such tasks include but are not limited to, picking and placing goods, transporting goods, loading conveyance vehicle(s), those tasks described herein with respect to pallet stacking/destacking, or any other suitable task. The autonomous guided vehicle 100 may send task completed signals to the management system 196 for closing a task (marking the task complete) and to effect reassignment of the autonomous guided vehicle 100 to a subsequent task.

The autonomous guided vehicle 100, through the robotic autonomous guided vehicle engine module 110, is configured for autonomous navigation throughout the travel area 198, from any start location/point to any end destination location/point in the travel area 198. For example, the autonomous guided vehicle 100, through the autonomous guided vehicle engine module 110, relies on inherent structure (e.g., storage racks, assembly robots, conveyors, paint booths, assembly stations, etc.) of the commercial logistic facility 199 rather than specialized navigation infrastructure (e.g., line following, mechanical guidance, radio/electromagnetic beacons, magnets, codified marks/tape, etc.) for navigating through the travel area 198.

Referring again to FIG. 1, the integrated motor(s) 111, sensors 112, and control system 113 may be packaged within a housing 120 forming the robotic autonomous guided vehicle engine module 110 that may be a module unit 121, in one aspect. Here, the module unit 121 includes a module interface 125 at one end of the module unit 121 for modular coupling of the module unit 121 with a logistic or material handling accessory module 150A-150n (generally referred to as logistic or material handling accessory module 150) of the autonomous guided vehicle 100. The module interface 125 is communicably coupled to the controller 114 for at least registering the logistic or material handling accessory module 150 with the controller 114 as described herein. In other aspects, the handling accessory may not be configured with modularity in assembly and may be joined so as to be integral to the frame of the robotic autonomous guided vehicle 100.

Figure 2:
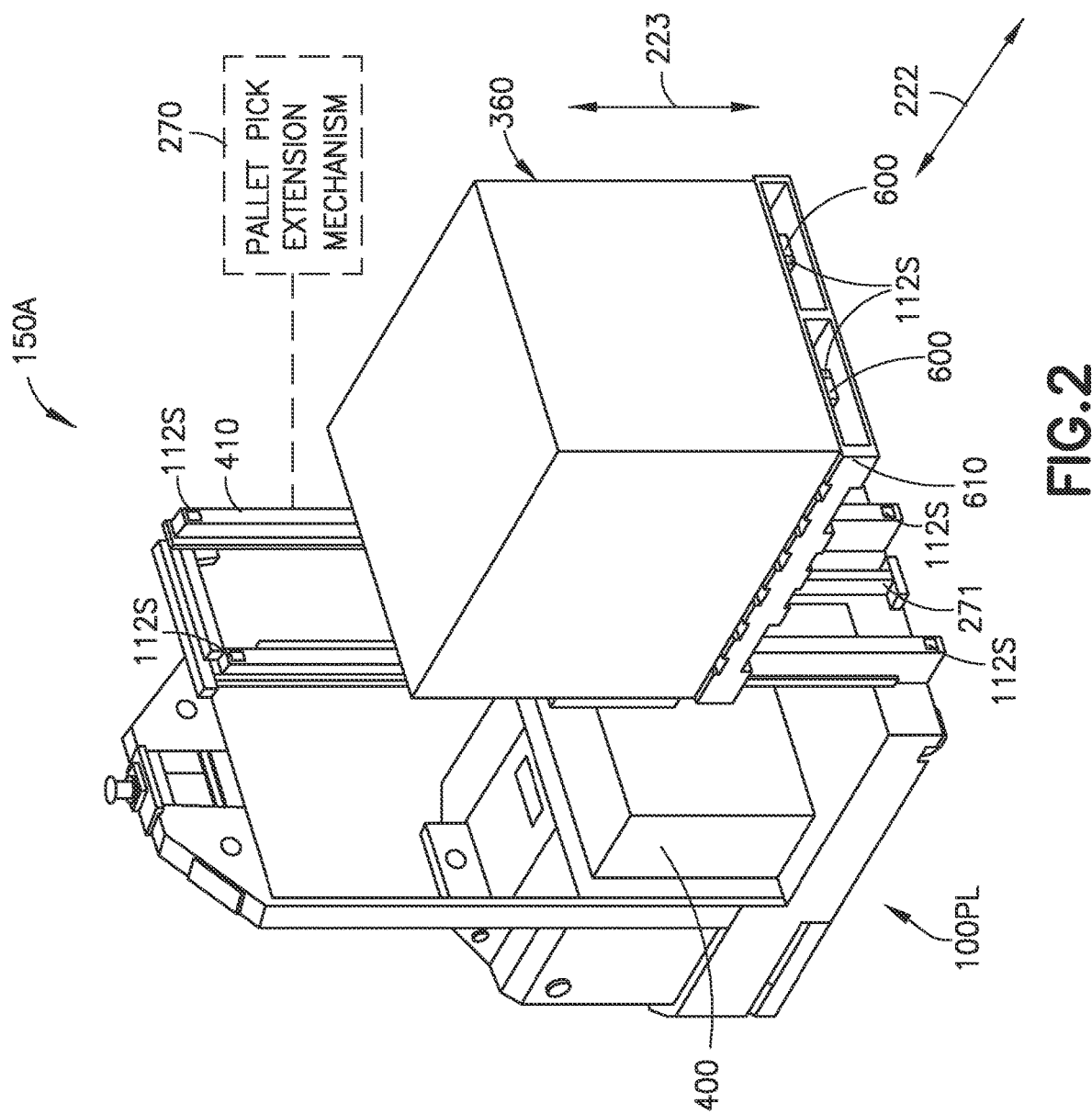
FIG. 2 is a perspective illustration of the autonomous guided vehicle of FIG. 1 in accordance with aspects of the disclosed embodiment.

Referring to FIG. 1, here the logistic or material handling accessory module 150 may include multiple different logistic or material handling accessory modules 150A-150n. The multiple different logistic or material handling accessory modules 150A-150n are configured to as to be modularly coupled to the module unit 121 of the autonomous guided vehicle 100 through the module interface 125 in any suitable manner such as through suitable releasable mechanical and/or electrical couplings. At least one of the logistic or material handling accessory modules 150A (FIGS. 1 and 2) has a corresponding predetermined logistic or material handling characteristic that defines a pallet fork lift-truck (pallet stacker) autonomous guided vehicle 100PL (FIG. 2). The pallet fork lift-truck autonomous guided vehicle 100PL may have a standard fork truck mast 410 configuration that includes a pallet pick 600 (i.e., forks or other pallet holding fingers, clamps, etc.) with a pallet pick interface 600INT (see FIG. 3) that can stack pallet loads on top of one another, such as when stacking pallet loads in a conveyance vehicle or other suitable location. The pallet pick 600 is configured to move, in any suitable manner such as described herein, bi-directionally in one or more pick directions 222, 223 relative to the robotic autonomous guided vehicle engine module 110 to at least lower and raise a pallet pick interface 600INT (substantially similar to those shown in FIG. 3) of the pallet pick 600 to interface with, engage, and pick (or place) a pallet 610A-610C and stably hold the picked pallet 610A-610C on the pallet pick 600.

Figure 3:
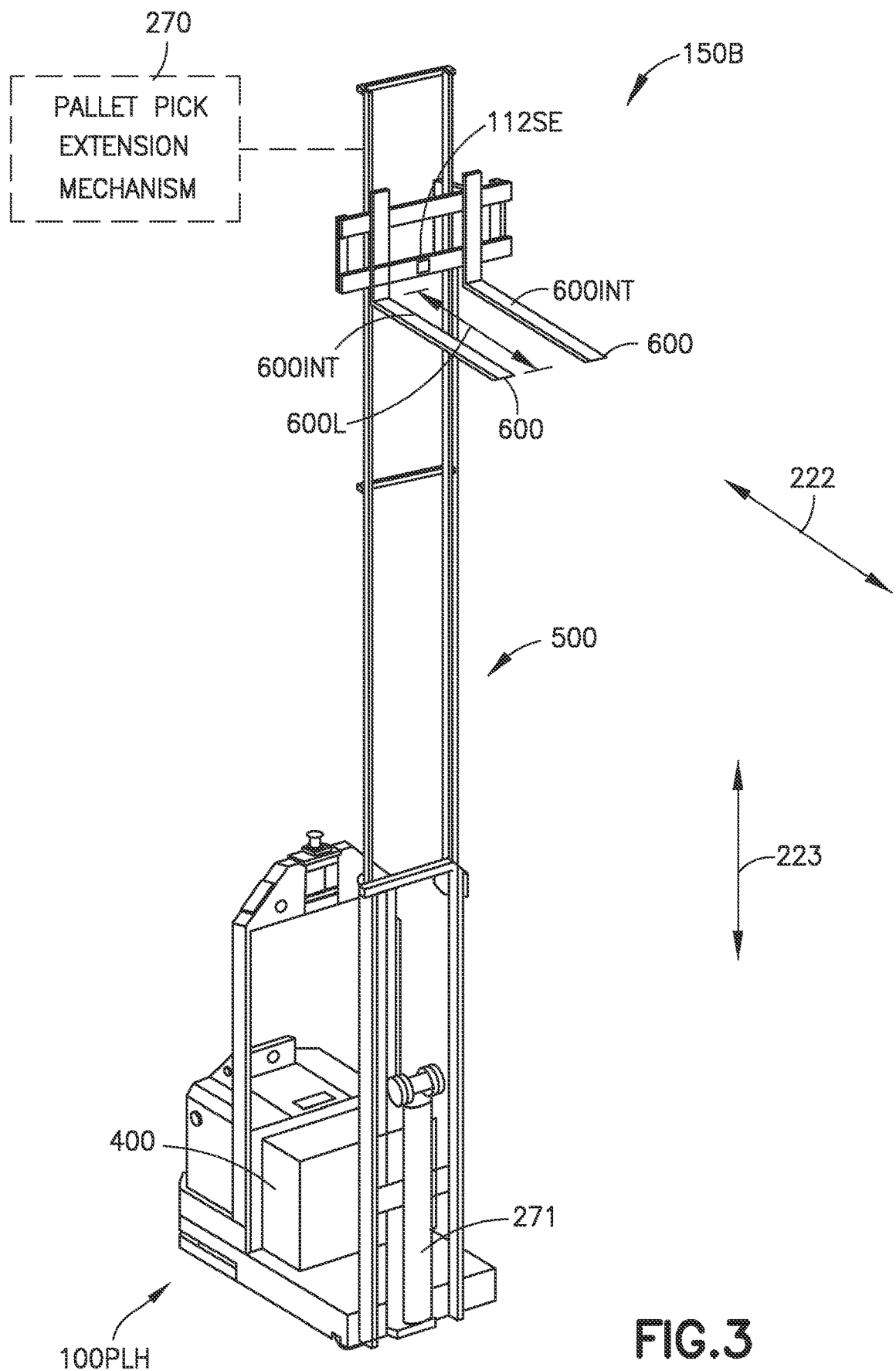
FIG. 3 is a perspective illustration of the autonomous guided vehicle of FIG. 1 in accordance with aspects of the disclosed embodiment.

At least one of the logistic or material handling accessory modules 150B (FIGS. 1 and 3) has a corresponding predetermined logistic or material handling characteristic that defines a high bay pallet lift-truck autonomous guided vehicle 100PLH (FIG. 3). The high bay pallet lift-truck autonomous guided vehicle 100PLH includes a multistage mast 500 that reaches heights of about 38 feet (in other aspects the multistage mast 500 may reach higher than about 38 feet or less than about 38 feet) and provides for the three-dimensional distribution of loads, such as in multi-level warehouse storage racks. The multistage mast 500 includes a pallet pick 600 (i.e., forks or other pallet holding fingers, clamps, etc.) with a pallet pick interface 600INT.

Figure 4:
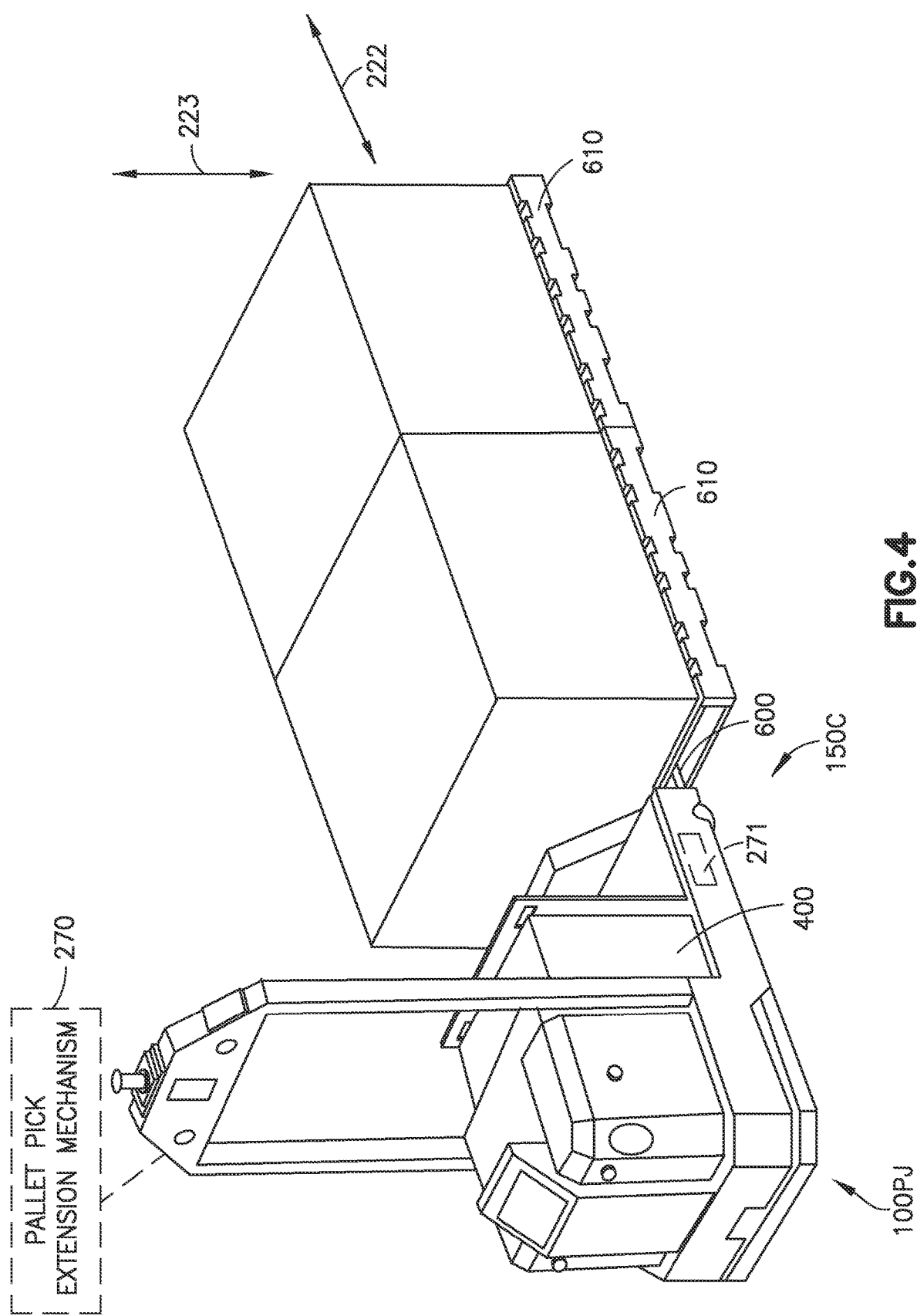
FIG. 4 is a perspective illustration of the autonomous guided vehicle of FIG. 1 in accordance with aspects of the disclosed embodiment.
Figure 6:
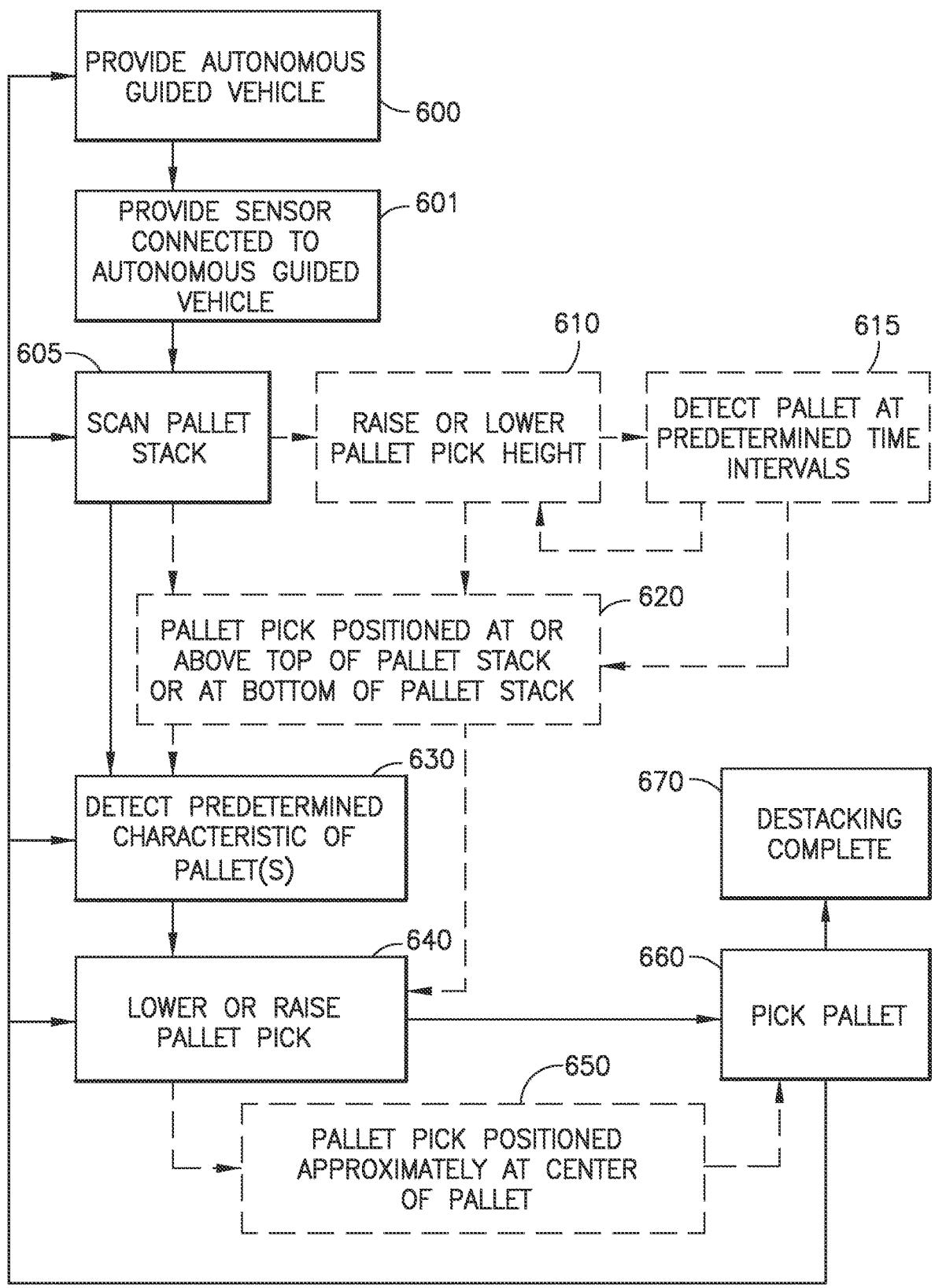
FIG. 6 is a flow diagram for pallet destacking with the autonomous guided vehicle of FIG. 1 in accordance with aspects of the disclosed embodiment.

At least one of the logistic or material handling accessory modules 150C (FIGS. 1 and 4) has a corresponding predetermined logistic or material handling characteristic that defines a pallet jack-truck autonomous guided vehicle 100PJ (FIG. 4). The pallet jack-truck autonomous guided vehicle 100PJ includes the pallet pick 600 (i.e., forks or other pallet holding fingers, clamps, etc.) with a pallet pick interface 600INT (similar to that shown in FIG. 3) that is configured to support one or more standard 48 in pallets 610. In one aspect, the forks 600 are configured to hold two or more standard 48 in pallets (for exemplary purposes only, FIG. 6 illustrates two standard 48 inch pallets being held by the forks 600). In other aspects, any suitable autonomous guided vehicle type (such as those described in U.S. patent application Ser. No. 16/586,040 filed on Sep. 27, 2019 and titled "Commercial Logistic Facility, Configurable Modular Robotic Autonomous Guided Vehicle, and Method Therefor", the disclosure of which was previously incorporated by reference herein) may be defined by a corresponding one of the material handling accessory modules 150A-150n.

In one aspect, the pallet pick 600 is coupled to the robotic autonomous guided vehicle engine module 110 so as to bi-directionally move relative to the robotic autonomous guided vehicle engine module 110 in a pick direction 223 (see FIGS. 2-4) to interface with, engage, and pick a pallet and stably hold the picked pallet on the pallet pick 600. For example, the accessory modules 150A-150C include a pallet pick lifting drive system 271 (e.g., hydraulic actuator, chain drive, belt drive, etc.—see FIGS. 2 and 3) configured to move the pallet pick 600, relative to the robotic autonomous guided vehicle engine module 110, in the pick direction 223. In some aspects, the accessory modules 150A-150C also include any suitable pallet pick extension mechanism 270, such as a scissors reach mechanism, to which the pallet pick 600 is coupled so as to extend and retract the pallet pick in a pick (extension) direction 222. In other aspects, movement of the pallet pick 600 in the pick (extension) direction 222 may be effected by movement/traverse of the robotic autonomous guided vehicle engine module 110 in the pick (extension) direction 222.

Where the autonomous guided vehicle type includes a lifting of goods with the autonomous guided vehicle 100 (such as with the pallet fork lift-truck autonomous guided vehicle 100PL (FIG. 2), the high bay pallet lift-truck autonomous guided vehicle 100PLH (FIG. 3), and the pallet jack autonomous guided vehicle 100PJ (FIG. 4)) the autonomous guided vehicle 100 may include any suitable counterweights 400 (see FIGS. 2-4) disposed at any suitable location of the autonomous guided vehicle 100 to counterbalance a weight of the goods carried by the autonomous guided vehicle 100.

Each of the different logistic or material handling accessory modules 150A-150*n* are configured so as to be selectably interchangeable with each other and configured to selectably couple with module unit 121 via (e.g., through) the module interface 125. The coupling between the different logistic or material handling accessory modules 150A-150*n* and the module interface 125 is a releasable coupling 130 that may be effected with any suitable mechanical and/or electrical connections (e.g., a bolt on and/or plug in couplings). For example, the module interface 125 includes structural coupling(s) 125S, power coupling(s) 125P, and/or data communication coupling(s) 125D that mate or otherwise couple with corresponding mating couplings 125MC of the different logistic or material handling accessory modules 150A-150*n*. Coupling and decoupling of the mechanical and/or electrical connections of the releasable coupling 130 may be effected autonomously by the autonomous guided vehicle 100; or in other aspects manually or semi-autonomously. Where the coupling is autonomous or semi-autonomous, the module interface 125 is a deterministic coupling (e.g., a kinematic coupling) that is deterministic of the relative pose between the logistic or material handling accessory modules 150 and the robotic autonomous guided vehicle engine module 110. The deterministic coupling effects coupling of the structural coupling(s) 125S, power coupling(s) 125P, and/or data communication coupling(s) 125D with the corresponding mating couplings 125MC (e.g., corresponding mating structural coupling(s), power coupling(s), and/or data communication coupling(s)) of the different logistic or material handling accessory modules 150A-150*n*.

The module interface 125 and the robotic autonomous guided vehicle engine module 110 are configured such that the loads exerted on or generated by the different logistic or material handling accessory modules 150A-150*n* are supported by and distributed to the robotic autonomous guided vehicle engine module 110. The logistic or material handling accessory module(s) 150 is/are coupled to the robotic autonomous guided vehicle engine module 110 so as to depend from the robotic autonomous guided vehicle engine module 110 and move as a unit with the robotic autonomous guided vehicle engine module 110.

Referring to FIG. 1, in one aspect, the module interface 125 and the control system 113 are communicably coupled and configured so as to allow the control system 113 to automatically (or in other aspects, manually) register the logistic or material handling accessory module 150 coupled with the module interface 125. For example, upon coupling of the module interface 125 with the logistic or material handling accessory module 150, one or more of the module interface 125 and the logistic or material handling accessory module 150 sends a signal to the control system 113 identifying the logistic or material handling accessory module 150; while in other aspects the control system 125 may interrogate one or more of the module interface 125 and the logistic or material handling accessory module 150 to determine/identify the logistic or material handling accessory module 150; while in still other aspects, the module unit 121 may include any suitable sensors that interact (either with contact or without contact) with one or more of the module interface 125 and the logistic or material handling accessory module 150 to identify the logistic or material handling accessory module 150. Under manual or semiautomatic registration, a suitable input, manual, or remote may be entered in the control system 113 identifying the logistic or material handling accessory module 150 to be coupled, and the control system 113 registers the logistic or material handling accessory module 150 so that coupling is complete when effected. The control system 113 registers the identification of the logistic or material handling accessory module 150 in any suitable memory, such as a registration module 116, of the controller 114 and changes the logistic or material handling autonomous guided vehicle type based on the registered logistic or material handling accessory module 150.

The controller 114 of the control system 113 is configured with different predetermined autonomous navigation programming 115A-115*n* having different predetermined autonomous navigation characteristics corresponding to the logistic or material handling autonomous guided vehicle type. Each of the different predetermined autonomous navigation programming effects at least control of the logistic or material handling accessory module 150, by the control system 113, according to the logistic or material handling autonomous guided vehicle type registered in the registration module 116 upon coupling of the logistic or material handling accessory module 150 to the module interface 125. Based on the logistic or material handling autonomous guided vehicle type configured with the module interface 125, the controller 114 is configured to access a corresponding autonomous navigation program 115A-115*n* for the logistic or material handling autonomous guided vehicle type registered. In this aspect, the autonomous guided vehicle 100 is self-configuring so as to automatically select the corresponding autonomous navigation program 115A-115*n* for the logistic or material handling autonomous guided vehicle type registered so as to provide one or more of a transfer of power, data, and commands between the logistic or material handling accessory module 150 and the robotic autonomous guided vehicle engine module 110. For example, where the logistic or material handling accessory modules 150A (FIG. 2) is coupled to the module interface 125 so as to configure the autonomous guided vehicle 100 as a pallet fork lift-truck autonomous guided vehicle 100PL (FIG. 2), the controller 114 selects an autonomous navigation program 115A-115*n* corresponding to pallet fork lift-truck autonomous guided vehicle 100PL (FIG. 2) so as to control power, data, and commands to the logistic or material handling accessory modules 150A for the operation of the fork lift-truck autonomous guided vehicle 100PL (e.g., sensor data, power, and control commands may be shared between the logistic or material handling accessory module 150 and the robotic autonomous guided vehicle engine module 110 for the operation of the fork lift-truck autonomous guided vehicle 100PL).

Figure 5A:
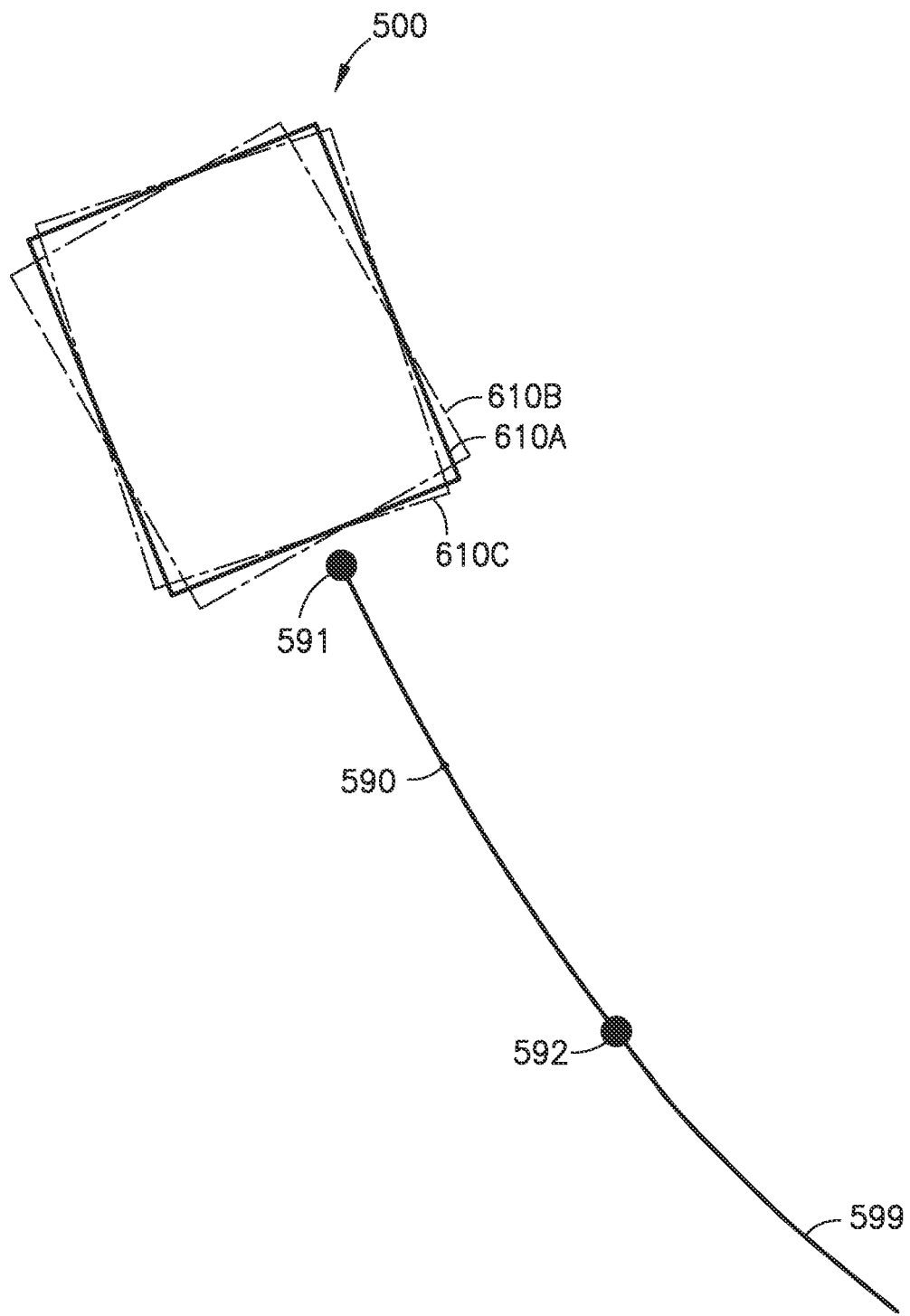
FIG. 5A is a plan view of an exemplary pallet stack and an exemplary autonomous guided vehicle path leading to the pallet stack in accordance with aspects of the disclosed embodiment.

Referring to FIGS. 1 and 5A-5D, the autonomous guided vehicle 100 is configured to navigate through the travel area 198 of the commercial logistic facility 199 in any suitable manner, such as along travel path 599 to a location, which in one aspect is a variable location, of the pallet stack 500. The travel path 599 may have any suitable waypoints or staging areas along the travel path 599. For exemplary purposes only, the travel path 599 may include a staging area 592 (e.g., a location in which the autonomous guided vehicle 100 waits for pallet commissioning/decommissioning operations to complete), a docking approach distance 590 (at which the pallet stack 500 is scanned by the autonomous guided vehicle 100), and a load area 591 (at which point the pallet pick 600 of the autonomous guided vehicle 100 is inserted into a pallet for picking the pallet). The docking approach distance 590 is a waypoint along the path 599 at which the autonomous guided vehicle 100 may or may not stop traversing along the path 599, and about at which scanning of the pallet stack 500 begins (e.g., the autonomous guided vehicle 100 may stop at the approach distance 590 to effect scanning or, in other aspects, the autonomous guided vehicle 100 may continue traverse along the path 599 with scanning starting at the approach distance 590). The approach distance 590 may be any suitable distance from the pallet stack 500 and may depend on a length 600L (FIG. 3) of the pallet pick 600, a range RNG and/or field of view FOV, FOV1 (FIG. 7C) of the at least one sensing element 112SE, a configuration of the pallet stack 500 (as can be seen in FIG. 5A edges or sides of the pallets 610A-610C may not be aligned with one another in the stack such that one or more pallets is rotated relative to other pallets in the pallet stack 500), or any other suitable criteria that may affect the scanning of the pallet stack 500 with the at least one sensing element 112SE.

It is noted that the approximate location of the pallet stack 500 is generally known by the controller 114 (with such location being obtained from for example, management system 196 or other control source). The path 599 may be generated using the approximate location of the pallet stack 500. With the autonomous guided vehicle 100 substantially at (or passing through) the approach distance 590 and traversing along the path 599, the sensors 112 of the autonomous guided vehicle 100 are employed to detect the pallet stack (or location thereof) and adjust the path trajectory to account for lateral and/or rotational variation in pallet stack location compared to the approximate location of the pallet stack known by or communicated to the controller 114.

Figure 5B:
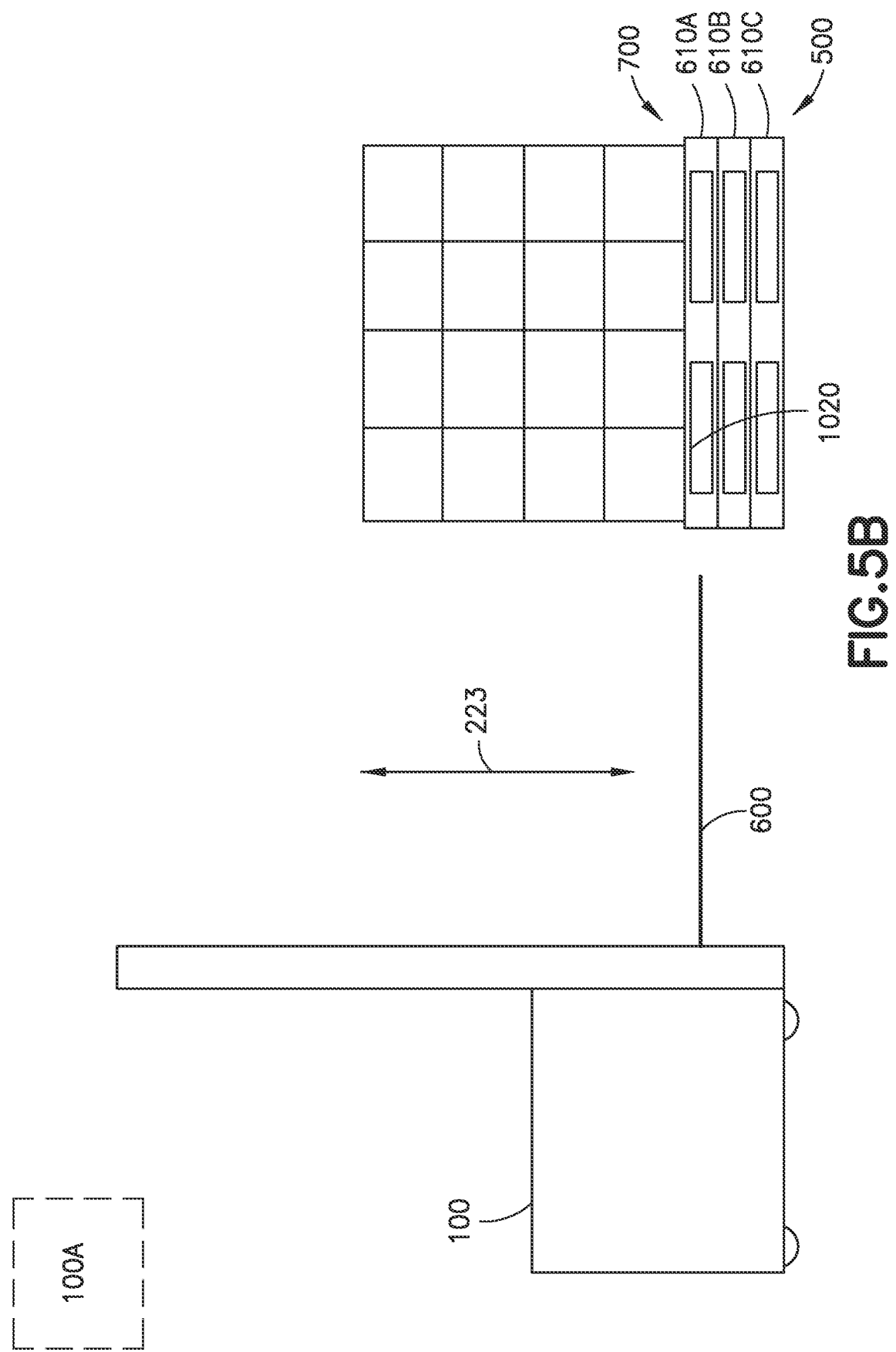
Figure 5C:
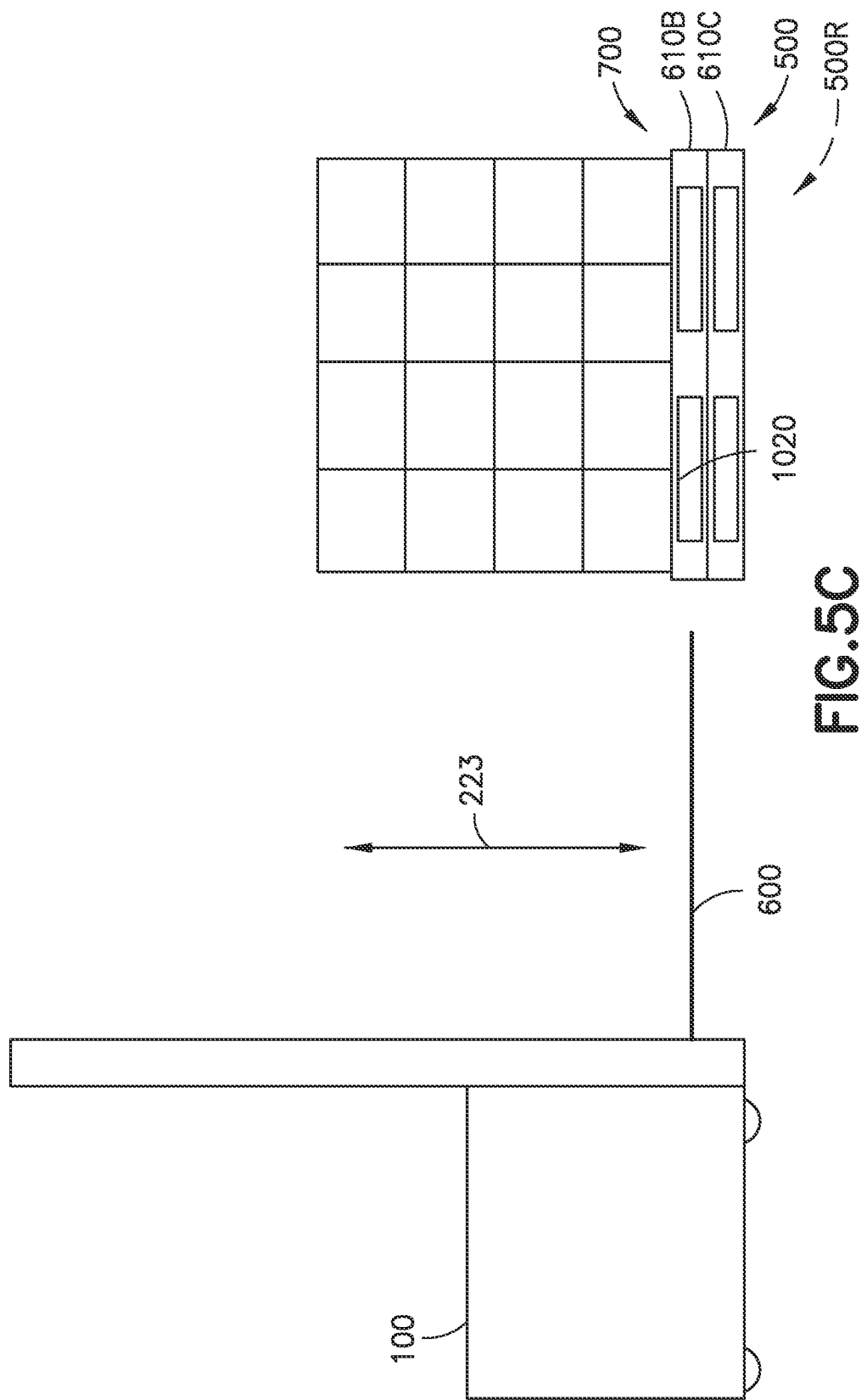

FIGS. 5B-5D illustrate the autonomous guided vehicle 100 at the docking approach distance 590 where the pallet pick 600 may be moved in the pick direction 600 so as to effect scanning of the pallet stack 500 in the manner described herein. FIG. 5B illustrates the pallet pick 600 at a height suitable for picking the top most pallet 610A in the pallet stack 500, where the pallet stack 500 includes for example three pallets 610A-610C (the pallet stack may include from one to any number of pallets as will be described). The pallet 610A is removed from the pallet stack 500 and transported by the autonomous guided vehicle 100 to any suitable location. As pallets are removed/picked from the pallet stack 500, the number of pallets in the pallet stack 500 decreases to form a remainder stack 500R and the height of pallet pick 600 is repositioned (e.g., upon return of the same autonomous guided vehicle or another autonomous guided vehicle to the pallet stack 500) to a height of the next topmost pallet 610B in the stack (FIG. 5C) until the remainder stack 500R includes only one pallet 610C (FIG. 5D). The pallet pick 600 is repositioned at a height suitable for picking the last pallet 610C in the remainder stack 500R.

Referring to FIGS. 1, 6, 7A-7C, and 10, in one aspect, the controller 114 is configured to effect positioning of the pallet pick interface 600INT to interface and engage the at least one pallet 610A-610C in the topmost pallet position 700, and pick (or otherwise remove, see FIGS. 7A-7C) the at least one pallet 610A-610C off from the topmost pallet position 700. In other aspects, the controller 114 is configured to effect positioning of the pallet pick interface 600INT to position (or otherwise place, see FIG. 7D) at least one pallet 610A held by the pallet pick interface 600INT onto the pallet stack 500 in the topmost pallet position 700 of the pallet stack 500. To pick or place pallets to or from the pallet stack 500 the controller 114 is communicably connected to the at least one sensor 112S so as to register the detected predetermined characteristic of the at least one pallet 610A-610C from the scanning of the pallet stack 500. For example, the detected predetermined characteristic of the at least one pallet 610A610C, in one aspect, correspond to or otherwise define pick positions of the at least one pallet 610A-610C from a top of the pallet stack to a bottom of the pallet stack. The pick position(s) are registered by the controller 114 and calibrated to any suitable predetermined reference frame (which may be a global reference frame) of the facility (e.g., the facility floor or support on which the pallet stack rests). In one aspect, the pick position is registered by the controller 114 during positioning motion in the pick direction 223A, 223B. In one aspect, the sensor 112S field of view FOV/scan line (see incremental scan steps S1-S12) is calibrated to a pick datum (e.g., the global reference frame or any other suitable reference frame) so that the controller 114 registers the sensor field/scan line position relative to the pick datum so that the sensor 112S is positioned relative to the pick datum. The controller 114 is configured to determine from the registered predetermined characteristic that the at least one pallet 610A-610C is in a topmost pallet position 700 of the pallet stack 500, and effect positioning, in the pick direction 222, of the pallet pick interface 600INT to interface the pallet stack 500 based on the determined topmost pallet position 700.

For exemplary purposes only the destacking of pallets from the pallet stack 500 will be described noting that the stacking of the pallets onto the pallet stack may be accomplished in a substantially similar manner except where noted below. In accordance with aspects of the disclosed embodiment, the autonomous guided vehicle 100 is provided (FIG. 6, Block 600). Sensors 112 are provided and connected to the autonomous guided vehicle 100 (FIG. 6, Block 601). The autonomous guided vehicle 100 travels along the path 599 (FIG. 5A) to arrive at, for example docking approach distance 590 (or any other suitable location relative to the pallet stack 500) with, in one aspect, the pallet pick 600 at a height of the bottom pallet 610C in the pallet stack 500 (see FIG. 7A); however, in other aspects the pallet pick 600 is at a height above the topmost pallet 610A in the pallet stack 500. As described above, the movable pallet pick is configured to bi-directionally move in pick direction 223 so that the at least one sensing element 112S moves in the pick direction 223A from a predetermined lower pallet (such as one or more of pallets 610B, 610C) to a predetermined higher pallet (such as pallet 610A) in the pallet stack 500 so as to scan the pallet stack 500 with at least one sensing element 112S (FIG. 6, Block 605) to detect the predetermined characteristic of one or more pallet(s) 610A-610C in the pallet stack 500 (FIG. 6, Block 630); however, in other aspects scanning may be performed (FIG. 6, Block 605) in scanning direction 223B from the predetermined higher pallet (such as pallet 610A) to the predetermined lower pallet (such as pallet 610C) to detect the predetermined characteristic of one or more pallet(s) 610A-610C in the pallet stack 500 (FIG. 6, Block 630). In one aspect, the predetermined higher pallet is the topmost pallet 610A in the pallet stack 500 and the predetermined lower pallet is located under (see pallets 610B, 610C) the predetermined higher pallet in the pallet stack 500, or is a bottom pallet (see pallet 610C) of the pallet stack 500. In one aspect, such as where the pallet stack 500 includes a single pallet (see FIG. 5D) the predetermined lower pallet and the predetermined higher pallet are a common pallet.

In one aspect, scanning is performed in pick direction 223A such as where a number of pallets in the pallet stack 500 is unknown. For example, at a pallet stack location the lowermost pallet will be supported by the facility surface 781 so that a height of the lowermost pallet is known. Scanning in direction 223A from the lowest pallet to the highest pallet provides for determination, by the controller 14, of the number of pallets in the pallet stack 500. In one aspect, the autonomous guided vehicle 100 aligns itself in an initial pose relative to the lowest pallet in the pallet stack 500 as the autonomous guided vehicle 100 traverses the path and approaches the pallet stack 500 and has identified the base position of the pallet stack 500 relative to, e.g., the global reference frame. The controller is configured to, based on the scan data, determine the pose (e.g., position and rotation) of each of the higher pallets compared to the lower pallet and determine if each of the pallets can be picked with the autonomous guided vehicle 100 in the initial pose. If the pallet to be picked (the topmost pallet or, e.g., the next lowest pallet relative to the topmost pallet with an accessible seat interface 1020) cannot be picked with the autonomous guided vehicle in the initial pose, the controller 14 commands the autonomous guided vehicle to reposition itself relative to the pallet to be picked to effect pallet pick (or placement of a pallet carried by the autonomous guided vehicle 100 based on the position and pose of topmost pallet and/or other pallets in the stack).

Figure 10:
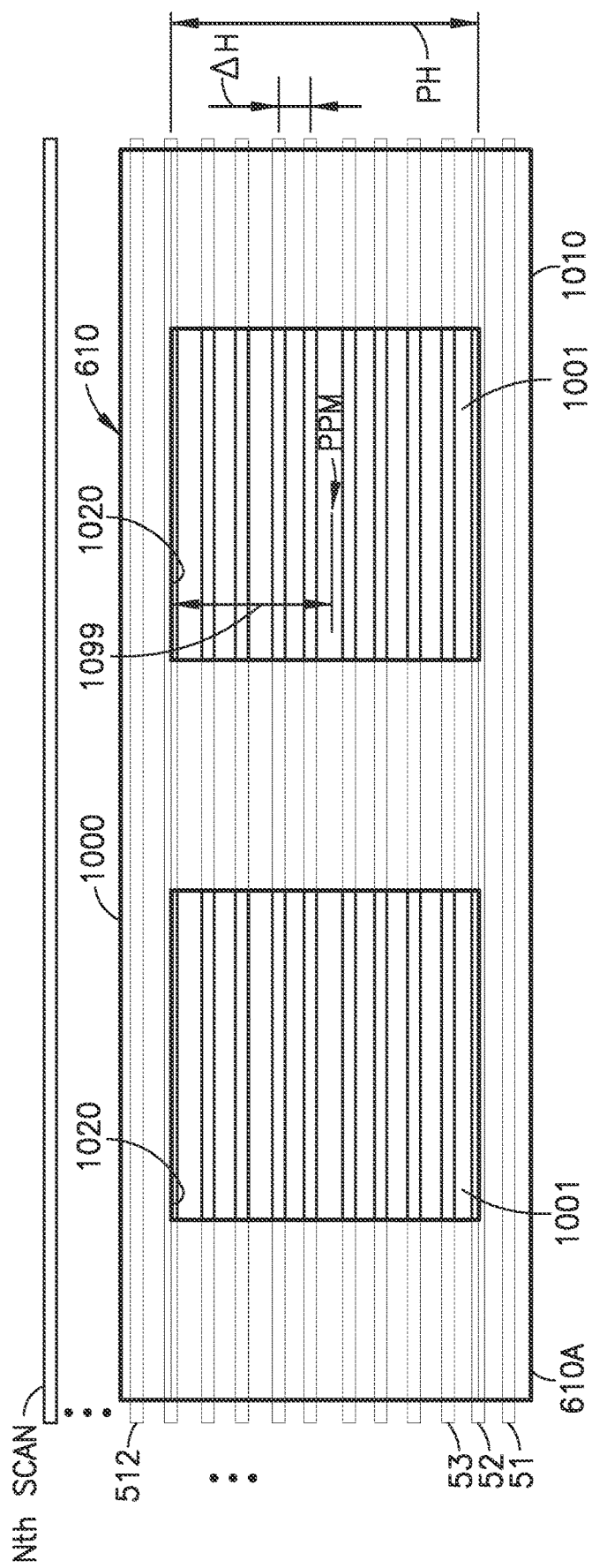
FIG. 10 is an exemplary illustration of a scanned image of a pallet in accordance with aspects of the present disclosure.

In one aspect, to scan the pallet stack 500 or pallet(s) within the pallet stack 500 the controller 14 commands (in any suitable manner) the autonomous guided vehicle 100 to raise the pallet pick 600 in pick direction 223A (FIG. 6, Block 610) from the predetermined lower pallet (such as one or more of pallets 610B, 610C) to a predetermined higher pallet (such as pallet 610A) in the pallet stack 500; however, in other aspects, the pallet pick 600 is commanded to lower in pick direction 223B (FIG. 6, Block 610) from the predetermined higher pallet (such as pallets 610A) to a predetermined lower pallet (such as one or more of pallets 610B, 610C) in the pallet stack 500. In one aspect, the at least one sensor element 112SE has a field of view FOV and the pallet pick 600 is moved in direction 223A, or in other aspects direction 223B, so as to effect scanning of the pallet(s) in the pallet stack 500 in incremental steps S1-S12 (twelve incremental steps are illustrated in FIG. 10 for exemplary purposes only and it should be understood that any suitable number of step may be employed), each step having a scan step height ΔH, where the at least one sensing element 112SE scans the pallet stack 500 at each incremental step so that the controller 14 forms a scan or image (with scan data received from the at least one sensor element 112SE) of at least one pallet in the pallet stack 500 as shown in FIG. 10 (it should be understood that a scan or image of the complete pallet stack 500 may also be generated). In one aspect the height ΔH of each step may be about 40 mm (about 1.5 in) or any other suitable incremental height. The pallet pick 600 continues to move in direction 223A, or in other aspects direction 223B, until the at least one sensing element 112SE no longer detects pallets in the pallet stack 500, or in other aspects detects or contacts the facility surface 781. For example, where the pallet picks moves in direction 223A, the pallet pick 600 may continue to move in direction 223A (past/above the topmost pallet 610A) any suitable distance so that N number of incremental pallet stack 500 scans (see the Nth scan in FIG. 10) are taken that no longer detect the pallets in the pallet stack 500; while in other aspects, the pallet pick 600 may continue to move in direction 223A (past/above the topmost pallet 610A) for any suitable timeout period (e.g. about 50 sec or in other aspects more or less than about 50 sec) such that if pallet data is not detected within the timeout period scanning stops. In one aspect, N is any suitable integer that represents a number of scans for which a null or no pallet scan data is received. For example, the pallet pick 600 may move a distance substantially equal to about 20 scan increments (e.g., 20 times ΔH, or any suitable number of scan increments) from a last scan (see, e.g., scan S12 in FIG. 10) at which a pallet was detected. In other aspects, the pallet pick 600 may be in a fluid continuous motion in direction 223A, or in other aspects direction 223B, where the at least one sensing element 112SE scans the pallet stack 500 at the scan step height ΔH with the pallet pick 600 in motion.

The controller 14 may command movement of the pallet pick 600 at any suitable movement rate (speed) so that a pallet detection scan is performed by the at least one sensing element 112SE at a predetermined time interval Δt (FIG. 6, Block 615). In one aspect the time interval Δt is about 20 ms (milliseconds); however in other aspects the time interval Δt may be greater or less than 20 ms. In one aspect rate of movement of the pallet pick 600 coincides with the time interval Δt and the scan step height ΔH.

While an incremental scanning of the pallet stack 500 and the pallet(s) 610A-610C thereof is described above, it is noted that in other aspects, the at least one sensor element 112SE may have a field of view FOV1 (see FIG. 7C) that captures the entire pallet stack 500 in a single scan. In still other aspects, the scan or imaging of the pallet stack 500 and the pallets 610A-610C thereof may be performed in any suitable manner.

As described above, the controller 14 is configured to, based on the scan data from the at least one sensing element 112S determine the predetermined characteristic of the pallet(s) 610A-610C in the pallet stack 500 (FIG. 6, Block 630). In one aspect, determining the predetermined characteristic includes determining an accessible, for the pallet pick interface, seat interface 1020 at or between the predetermined lower pallet (e.g., one of pallets 610B, 610C) and the predetermined higher pallet (e.g., pallet 610A) in the pallet stack 500 from which the predetermined higher pallet depends, and position the pallet pick interface 600INT to interface the predetermined pallet stack 500 at the seat interface 1020.

In one aspect, the seat interface 1020 is determined by identifying/determining the predetermined characteristic of at least one pallet 610A-610C located in the pallet stack 500. Determination of a pallet pocket 1001 will be described for exemplary purposes only and it should be understood that the seat interface 1020 may be determined in any suitable manner from the scan data and/or any suitable predetermined characteristic of at least one pallet 610A-610C. Using pallet 610A as an example, the pallet pocket 1001 (and the corresponding height in the pallet stack 500) is determined by completing a group of consecutive scans that include pallet data (e.g., scans S1-S12). A height of the first (lowest) scan S1 and a height of the last (highest) scan S12 are recorded by the controller 14. The controller 14 is configured to analyze the scan data in any suitable manner, such as with image recognition algorithms, to identify the pallet pockets 1001. Based on the recorded heights of the scans S1, S12 (and/or the incremental scan heights there-between) the controller 14 determines the height PH of the pallet pockets 1001 in any suitable manner. If the determined height PH exceeds (is greater than) a minimum pallet pocket height (e.g., about 60 mm (about 2.25 in) or in other aspects more or less than about 60 mm) and is less than a maximum pallet pocket height (e.g., about 150 mm (about 6 in) or in other aspects more or less than about 150 mm) (the minimum and maximum pallet pocket heights being determined from an expected/predetermined tolerance range of the pallets—e.g., from pallet CAD drawings, from the pallet manufacturer, etc.) the controller 14 determines and records the midpoint or height PPM of the determined pallet pocket 1001. The determination of the pallet pocket midpoint PPM may be performed for each pallet 610A-610C in the pallet stack 500, for the pallet in the topmost position 700, or the topmost pallet with an accessible seating interface 1020) at initial scanning of the pallet stack 500 so that the remainder stack 500R need not be scanned and the scan data for each pallet is registered by the autonomous guided vehicle 100 or communicated to another autonomous guided vehicle commanded to pick a pallet from the remainder stack 500R. In other aspects, determination of the pallet pocket midpoint PPM may be performed for each pallet 610A-610C in the remainder stack 500R, for the pallet in the topmost position 700, or the topmost pallet with an accessible seating interface 1020) at a subsequent scanning of the remainder stack 500R.

Figure 11:
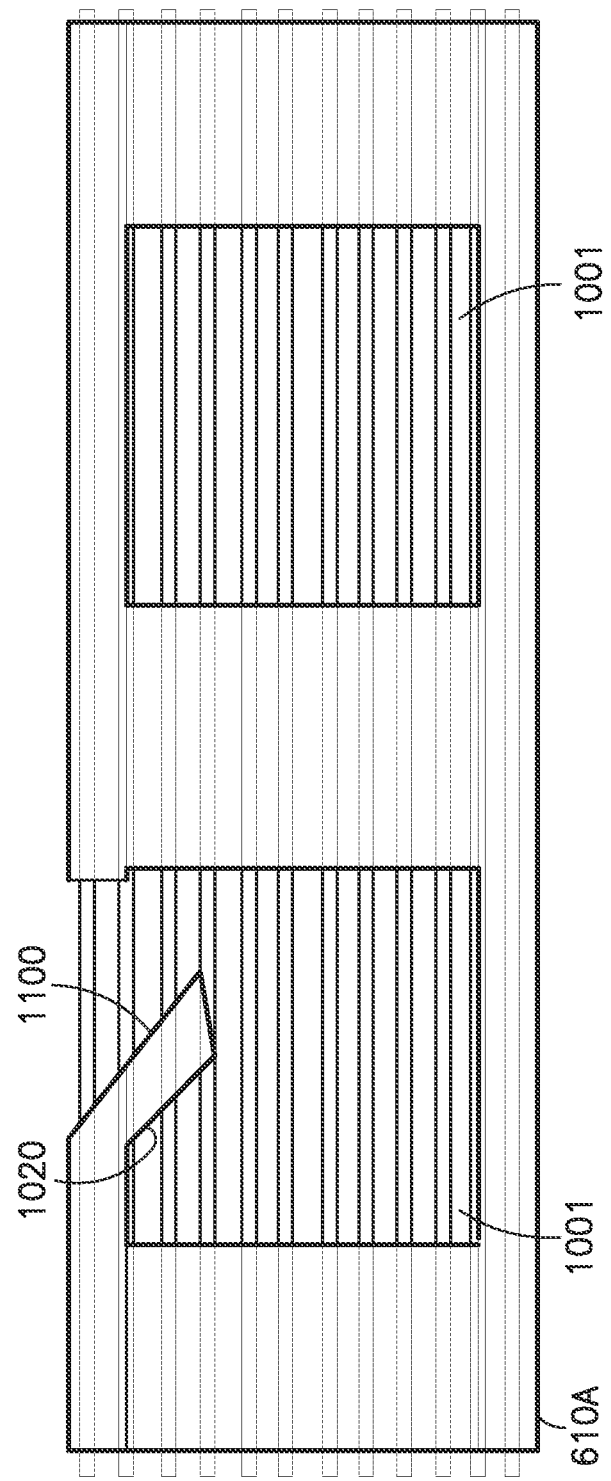
FIG. 11 is an exemplary illustration of a scanned image of a pallet including a pick obstruction in accordance with aspects of the present disclosure.
Figure 12:
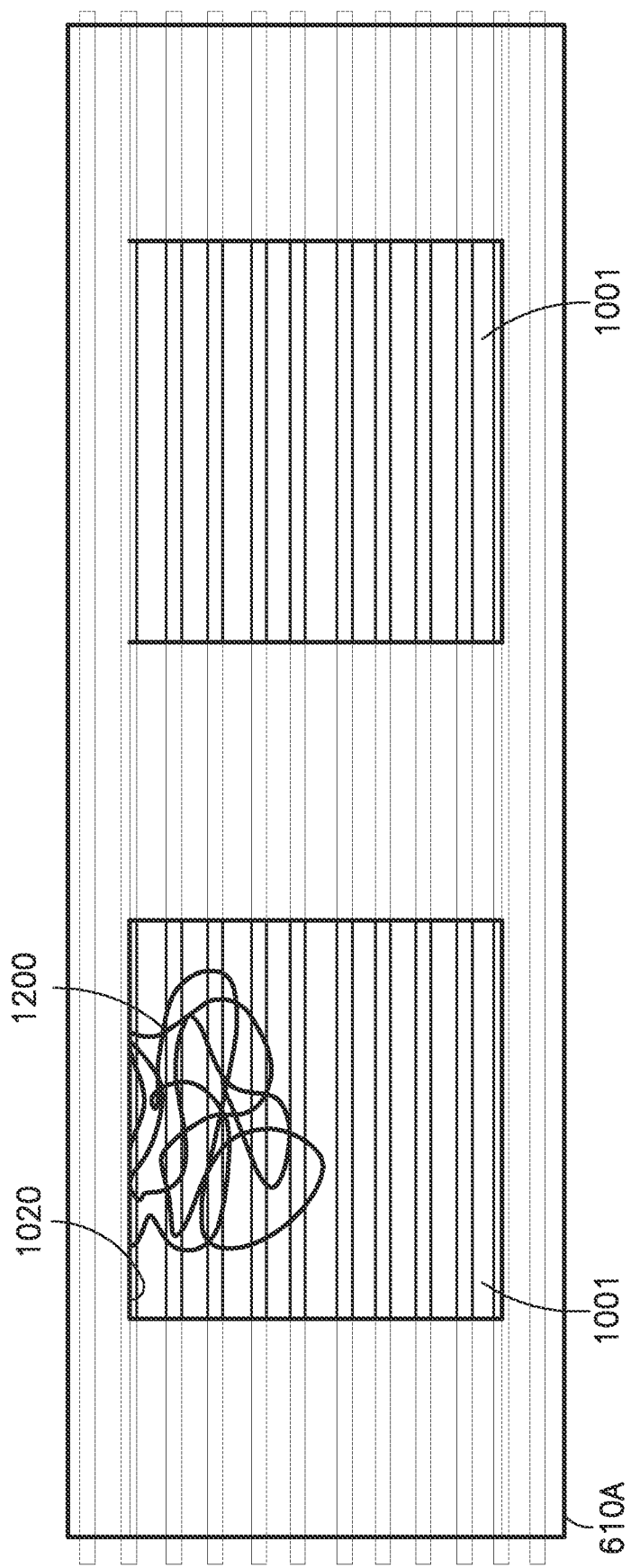
FIG. 12 is an exemplary illustration of a scanned image of a pallet including a pick obstruction in accordance with aspects of the present disclosure.

The controller 14 is configured to determine whether the seat interface 1020 is in a nominal condition (and is accessible) so as to conform to stable engagement and stable seating of the pallet pick interface 600INT with the seat interface 1020 of the at least one pallet 610A-610C. The accessible seat interface 1020 is disposed on the predetermined lower pallet, or on the predetermined higher pallet so that when a pallet is determined to have an inaccessible seat interface 1020 the controller 14 commands picking of another pallet having an accessible seat surface 1020 that is above (higher) or below (lower) than the pallet with the inaccessible seat surface 1020. In one aspect, the controller 14 is configured in any suitable manner, such as with suitable image recognition algorithms, to determine whether the seat interface 1020 of the at least one pallet 610A-610C in the topmost position 700 is accessible to the pallet pick interface 600INT. In other aspects, controller 14 is configured in any suitable manner, such as with suitable image recognition algorithms, to determine whether the seat interface 1020 of the each pallet 610A-610C in the pallet stack 500 is accessible to the pallet pick interface 600INT. Examples of a seat interface 1020 that does not conform to nominal conditions are illustrated in FIGS. 11 and 12. FIG. 11 (see also FIG. 9A) illustrates a seat interface 1020 formed by a broken/damaged pallet top surface such that a portion of the top surface 1100 extends into the pallet pick pocket 1001. FIG. 12 (see also FIG. 9B) illustrates a seat surface 1020 that is obstructed by pallet shrink wrap 1200. The damaged top surface 1100 and/or the shrink wrap 1200 may preclude entrance of the pallet pick 600 into the pallet pick pocket 1001 and the respective seat surfaces 1020 of the pallet pick pockets 1001 are determined to be inaccessible by the controller 14. In one aspect, where scanning of the pallet stack 500 occurs in an upward direction (e.g., pick direction 223A) and a pallet within the pallet stack 500 is not recognizable (e.g., the pallet pick pockets are wholly obstructed or the pallet is damaged so as to be unusable) from the scan data the controller 14 may command scanning of the pallet stack 500 to stop and picking of a pallet that is below the unrecognized pallet (i.e., picking of a pallet that is not the highest in the pallet stack 500).

On the controller 14 determining inaccessibility of the seat interface 1020 of the at least one pallet (such as pallet 610A) in the topmost position 700, the controller 14 is configured to determine at least another seat interface 1020 that is accessible, of another pallet (such as of the lower pallet(s) 610B, 610C) stacked under the topmost pallet position 700, and effects positioning of the pallet pick interface 600INT to interface the at least another seat interface 1020 and pick the at least one pallet (e.g., pallet 610A) from the topmost pallet position 700 from interface with the at least another seat interface 1020 of the lower pallet (such as one of the lower pallet(s) 610B, 610C). In one aspect, the at least another seat interface 1020 is adjacent to the pallet in the topmost pallet position 700. For example, the other seat interface 1020 may be the seat interface 1020 of pallet 610B, where pallet 610A is in the topmost position 700. In another example (See FIG. 5C) the other seat interface 1020 may be the seat interface 1020 of pallet 610C, where pallet 610B is in the topmost position 700.

In one aspect, on the controller 14 determining inaccessibility of the seat interface 1020 of the at least one pallet (such as pallet 610A) in the topmost position 700, the controller 14 is configured to determine a topmost accessible seat interface 1020 for the at least one pallet in the topmost position 700. In one aspect the topmost accessible seat interface 1020 is determined from the seat interface 1020 of the pallet in the topmost position 700. For example, where pallet 610A is in the topmost position 700 and the seat interface 1020 of pallet 610A is determined to be inaccessible, the controller determines the next lowest pallet relative to the topmost position 700 that has an accessible seat interface 1020. Where both pallets 610B, 610C have accessible seat interfaces 1020 and pallet 610B is positioned above pallet 610C, the topmost accessible seat interface 1020 is the seat interface 1020 of pallet 610B. In another aspect the topmost accessible seat interface 1020 is determined from another seat interface 1020 of at least another pallet in a stack position supporting the at least one pallet in the topmost position. For example, where pallet 610A is in the topmost position 700 and the seat interface 1020 of pallet 610A and the seat interface 1020 of pallet 610B are determined to be inaccessible, the controller 14 determines the next lowest pallet that has an accessible seat interface 1020 relative to the seat interface 1020 of pallet 610B.

Prior to or after the detection of the predetermined characteristic of the pallet(s) (FIG. 6, Block 630), the pallet pick is positioned (as a result of the scanning of the pallet stack), in one aspect, at a height substantially equal to or greater than a height of the top of the pallet stack 500 (see FIG. 7B), or in other aspects at the bottom of the pallet stack 500 adjacent the facility surface 781 (e.g., in a position substantially similar to that shown in FIG. 7A) (FIG. 6, Block 620). The controller 14 commands movement of the pallet pick 600 (e.g., raising of the pallet pick 600 and/or lowering of the pallet pick 600) to pick 660 the predetermined higher pallet (such as pallet 610A) from the accessible seat interface 1020 of the pallet 610A, or if the seat interface of pallet 610A is inaccessible from an accessible seat interface 1020 or one of pallets 610B, 610C (FIG. 6, Block 660). In one aspect, the controller commands movement of the pallet pick 600 so that the pallet pick 600 is positioned approximately at a center of the pallet (such as at the midpoint or height PPM—FIG. 10). In one aspect, the pallet pick 600 may be positioned to pick the predetermined higher pallet (such as pallet 610A) with any suitable offset 1099 (FIG. 10) relative to the accessible seat interface so that the pallet pick 600 may be moved in pick direction 222 (FIG. 7C) for inserting the pallet pick 600 into the pallet pocket(s) 1001 so as to interface with, engage, and pick the pallet(s) 610A-610C and stably hold the picked pallet(s) 610A-610C on the pallet pick 600.

Referring to FIGS. 5B-5D, the controller 14 is configured to register pick off the pallet stack 500, by the pallet pick 600 of the predetermined higher pallet (such as pallet 610A or subsequent higher pallets in the remainder stack 500R as the height of the pallet stack 500 decreases as illustrated in FIGS. 5B-5D) from the accessible seat interface 1020 so as to generate a remainder stack 500R. The controller is configured to determine, from the scan data (e.g., the initial scan data as noted above) of the pallet stack 500 (or from subsequent scan data of the remainder stack 500R as noted above), a position of a topmost pallet 700 of the remainder stack 500R (i.e., the topmost pallet being pallet 610B in FIG. 5C and pallet 610C in FIG. 5D), and a position of another accessible seat interface 1020 corresponding to the topmost pallet 700 of the remainder stack 500R (i.e., the other accessible seat interface being seat interface 1020 of one of pallets 610B, 610C in FIG. 5C and seat interface 1020 of pallet 610C in FIG. 5D). The controller 14 is configured to communicate the position of the other accessible seat interface 1020 to the automated guided vehicle 100 or another automated guided vehicle 100A (FIG. 5B) for picking of the topmost pallet (pallet 610B in FIG. 5C and pallet 610C in FIG. 5D) off the remainder stack 500R from the other accessible seat interface. It is noted that Blocks 600-660 of FIG. 6 may be repeated until all pallets (or a desired number of pallets) are removed from the pallet stack 500.

Figure 7B:
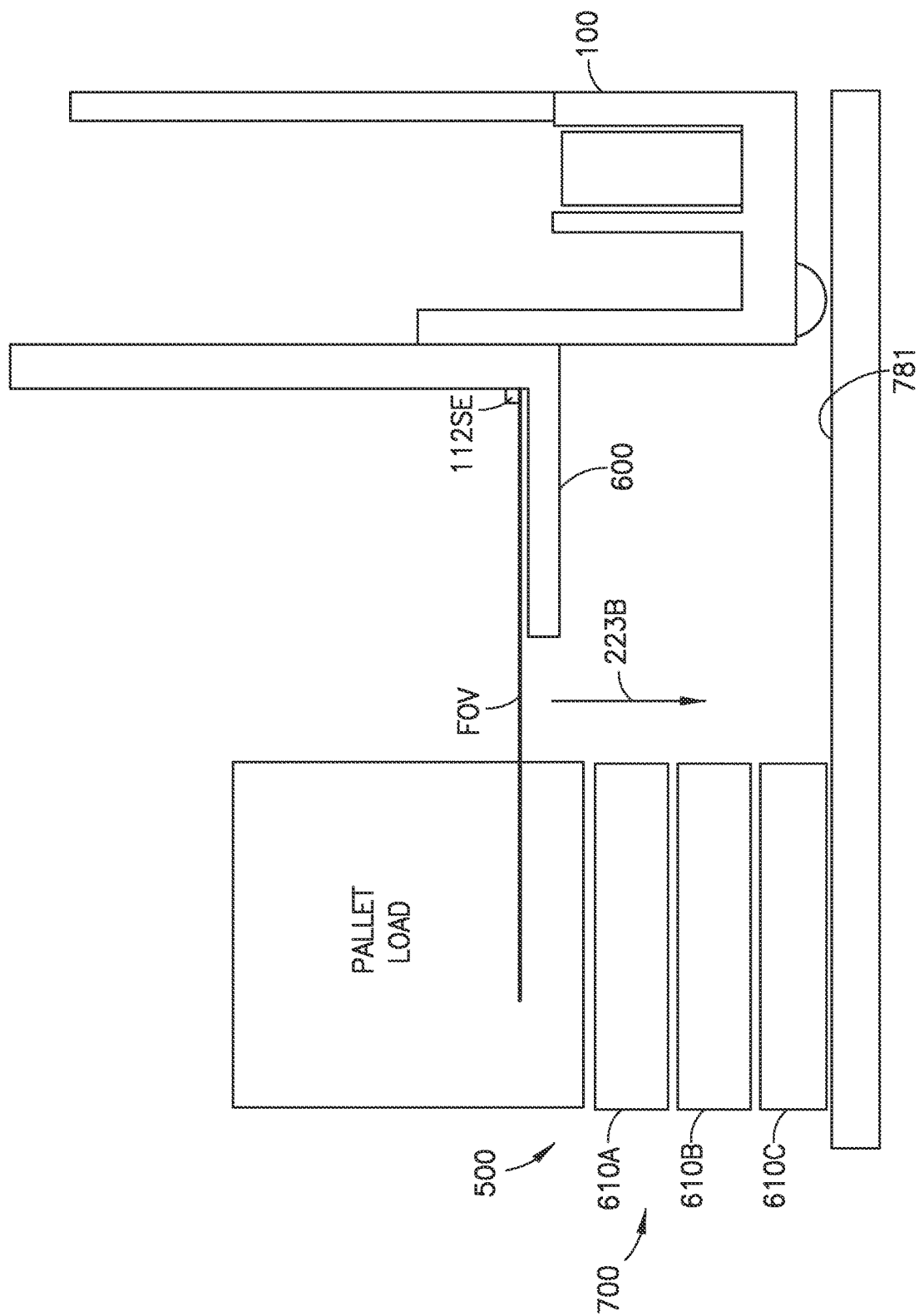
Figure 7C:
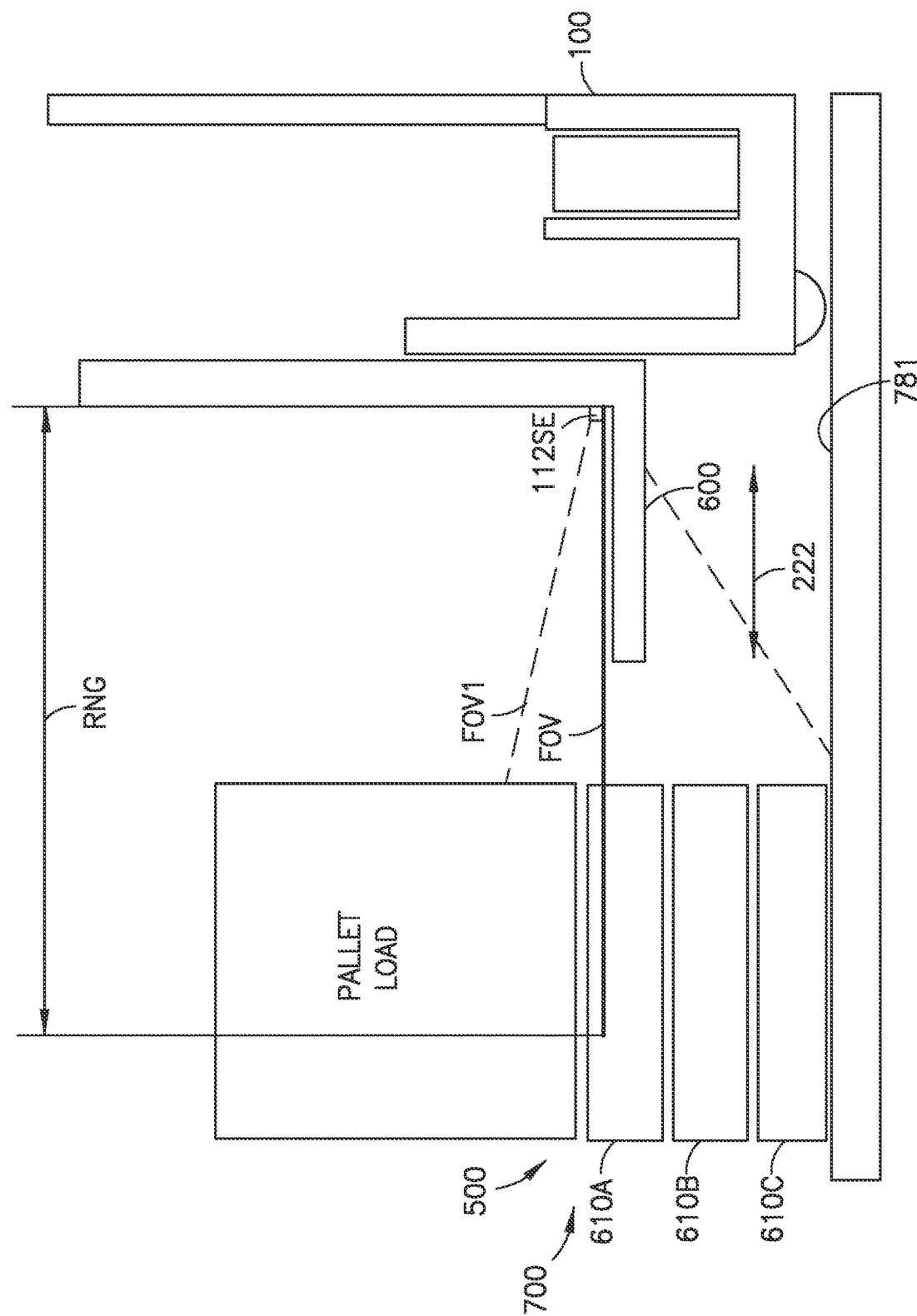
Figure 8:
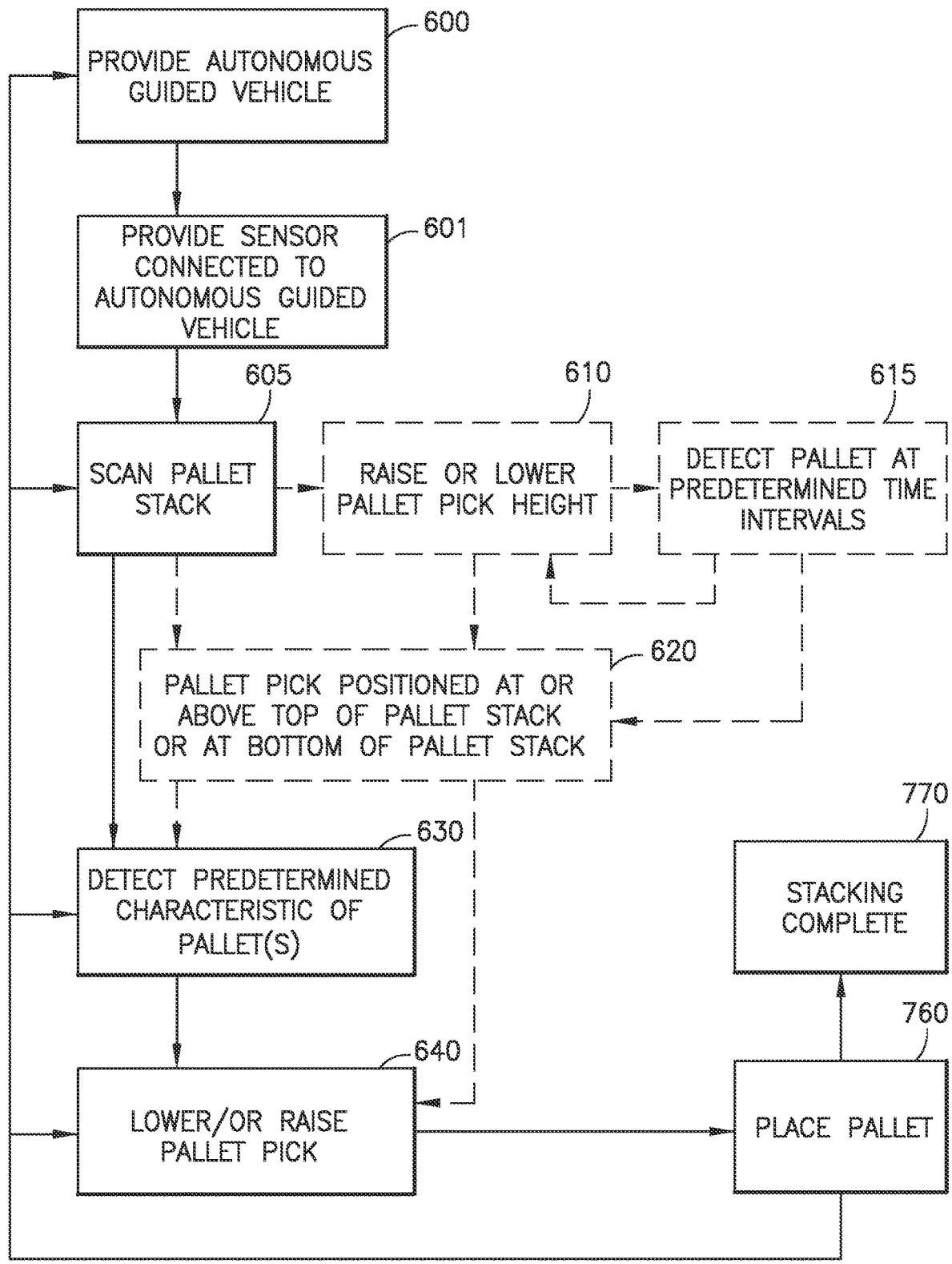
FIG. 8 is a flow diagram for pallet stacking with the autonomous guided vehicle of FIG. 1 in accordance with aspects of the disclosed embodiment.

As described above, referring to FIGS. 1, 6, 7A-7C, 8, and 10, the aspects of the disclosed embodiment also provide for stacking of pallets in the pallet stack 500. Stacking of the pallets in the pallet stack 500 occurs in a manner substantially similar to the destacking of the pallets from the pallet stack 500 described above; however, to stack the pallets the autonomous guided vehicle 100 is provided with a pallet held on the pallet pick 600 as shown in FIG. 7D. The pallet stack 500 is scanned as described above (see Blocks 601-630 of FIGS. 6 and 8). The pallet pick 600 is lowered (and/or raised) to place the pallet, such as pallet 610A) to the pallet stack 500 in substantially an opposite manner to removal of the pallet 610A described above with respect to FIGS. 7A-7B. For example, the pallet 610A is positioned at a height greater than the top surface of pallet 610B (see FIG. 7D) and the autonomous guided vehicle moves in direction 222 to position the pallet 610A over/above the pallet 610B (see FIG. 7C). The pallet pick 600 is moved in direction 223B (see FIG. 7B) to place the pallet 610A on the pallet stack 500 and then moves in direction 222 to retract the pallet pick 600 from the pallet pockets 1001 of the placed pallet 610A. Blocks 600-760 of FIG. 8 may be repeated until the pallet stack 500 includes any suitable number of pallets.

In accordance with one or more aspects of the disclosed embodiment a mobile automated guided vehicle pallet stacker and destacker system comprises:

a mobile automated guided vehicle having a vehicle base and movable pallet pick with a pallet pick interface, the movable pallet pick being configured to move, relative to the vehicle base, in a pick direction to interface with, engage, and pick a pallet and stably hold the picked pallet on the pallet pick;

a sensor communicably connected to the mobile automated guided vehicle, and configured to detect a predetermined characteristic of at least one pallet located in a stack of one or more pallets, wherein at least one sensing element of the sensor is mounted to the mobile automated guided vehicle so as to define a predetermined relation between the at least one sensing element and the pallet pick interface of the movable pallet pick, wherein the at least one sensing element is disposed so that actuation of the movable pallet pick in the pick direction effects scanning of the stack of one or more pallets and detection, with the at least one sensing element, of the predetermined characteristic of the at least one pallet in the stack of one or more pallets; and a controller communicably connected to the at least one sensor so as to register the detected predetermined characteristic of the at least one pallet from the scanning of the stack of one or more pallets, and the controller is configured to determine from the registered predetermined characteristic that the at least one pallet is in a topmost pallet position of the stack of one or more pallets, and position, in the pick direction, the pallet pick interface of the movable pallet pick to interface the stack based on the determined topmost pallet position.

In accordance with one or more aspects of the disclosed embodiment the controller is configured to effect positioning of the pallet pick interface to interface and engage the at least one pallet in the topmost pallet position, and pick the at least one pallet off from the topmost pallet position.

In accordance with one or more aspects of the disclosed embodiment the controller is configured to effect positioning of the pallet pick interface to position the at least one pallet held by the pallet pick interface of the movable pallet pick onto the stack of one or more pallets in the topmost pallet position of the stack of one or more pallets.

In accordance with one or more aspects of the disclosed embodiment the at least one sensing element is disposed so as to move in the pick direction coincident with motion of the movable pallet pick in the pick direction, and detect the predetermined characteristic of the at least one pallet in the stack of one or more pallets independent of whether the movable pallet pick holds the at least one pallet thereon.

In accordance with one or more aspects of the disclosed embodiment the at least one sensing element is mounted to the movable pallet pick.

In accordance with one or more aspects of the disclosed embodiment the scanning of the stack of one or more pallets with at least one sensing element detects the predetermined characteristic of each pallet of the one or more pallets in the stack of one or more pallets.

In accordance with one or more aspects of the disclosed embodiment the predetermined characteristic is determinative of a seat interface of the at least one pallet, and the controller is configured to determine whether the seat interface is in a nominal condition so as to conform to stable engagement and stable seating of the pallet pick interface with the seat interface of the at least one pallet.

In accordance with one or more aspects of the disclosed embodiment the controller is configured to determine whether the seat interface of the at least one pallet in the topmost position is accessible to the pallet pick interface.

In accordance with one or more aspects of the disclosed embodiment on determining inaccessibility of the seat interface of the at least one pallet in the topmost position, the controller is configured to determine at least another seat interface that is accessible, of another pallet stacked under the topmost pallet position, and effects positioning of the pallet pick interface to interface the at least another seat interface and pick the at least one pallet from the topmost pallet position from interface with the at least another seat interface.

In accordance with one or more aspects of the disclosed embodiment the at least another seat interface is adjacent to the at least one pallet in the topmost pallet position.

In accordance with one or more aspects of the disclosed embodiment the controller is configured to determine a topmost accessible seat interface for the at least one pallet in the topmost position, wherein the topmost accessible seat interface is determined from the seat interface of the at least one pallet in the topmost position, or another seat interface of at least another pallet in a stack position supporting the at least one pallet in the topmost position.

In accordance with one or more aspects of the disclosed embodiment the at least one sensing element is at least one of a two-dimensional LIDAR sensor, a three-dimensional LIDAR sensor, an RGB camera, a depth camera, and a time-of-flight camera.

In accordance with one or more aspects of the disclosed embodiment a logistic facility management system comprises:

at least one mobile automated guided palletizer/depalletizer vehicle arranged for automated navigation throughout at least part of a facility surface, the at least one mobile automated guided palletizer/depalletizer vehicle having a vehicle base and movable pallet pick with a pallet pick interface, the movable pallet pick being configured to move bi-directionally relative to the vehicle base to lower and raise the pallet pick interface to interface with, engage, and pick a pallet and stably hold the picked pallet on the movable pallet pick;

a sensor communicably connected to the at least one mobile automated guided palletizer/depalletizer vehicle, and configured to detect a predetermined pallet stack at a dynamically variable location on the at least part of the facility surface, the predetermined pallet stack having one or more pallets;

wherein the sensor has at least one sensing element disposed on the at least one mobile automated guided palletizer/depalletizer vehicle in a predetermined relation with respect to the pallet pick interface so as to move as a unit with the movable pallet pick in a direction scanning the predetermined pallet stack, with the at least one sensing element, from a predetermined lower pallet to a predetermined higher pallet in the predetermined pallet stack; and a controller communicably connected to the at least one sensing element to receive therefrom scan data of the predetermined pallet stack, the controller being configured to determine from the scan data an accessible, for the pallet pick interface, seat interface at or between the predetermined lower pallet and the predetermined higher pallet in the predetermined pallet stack from which the predetermined higher pallet depends, and position the pallet pick interface to interface the predetermined pallet stack at the accessible seat interface.

In accordance with one or more aspects of the disclosed embodiment the predetermined higher pallet is a topmost pallet of the predetermined pallet stack.

In accordance with one or more aspects of the disclosed embodiment the predetermined lower pallet is located under the predetermined higher pallet in the predetermined pallet stack, or is a bottom pallet of the predetermined pallet stack.

In accordance with one or more aspects of the disclosed embodiment the predetermined lower pallet and the predetermined higher pallet are a common pallet.

In accordance with one or more aspects of the disclosed embodiment the accessible seat interface is disposed on the predetermined lower pallet, or on the predetermined higher pallet.

In accordance with one or more aspects of the disclosed embodiment the movable pallet pick picks the predetermined higher pallet from the accessible seat interface.

In accordance with one or more aspects of the disclosed embodiment the controller is configured to register pick off the pallet stack, by the movable pallet pick of the predetermined higher pallet from the accessible seat interface generating a remainder stack, and determine, from the scan data of the predetermined pallet stack, a position of a topmost pallet of the remainder stack, and a position of another accessible seat interface corresponding to the topmost pallet of the remainder stack, and communicate the position of the other accessible seat interface to the at least one mobile automated guided palletizer/depalletizer vehicle or another mobile automated guided palletizer/depalletizer vehicle for picking of the topmost pallet off the remainder stack from the other accessible seat interface.

In accordance with one or more aspects of the disclosed embodiment a method for picking pallets from a pallet stack with a mobile automated guided vehicle pallet stacker and destacker system is provided. The method comprises:

providing a mobile automated guided vehicle having a vehicle base and movable pallet pick with a pallet pick interface, the movable pallet pick being configured to move, relative to the vehicle base, in a pick direction to interface with, engage, and pick a pallet and stably hold the picked pallet on the pallet pick;

providing a sensor communicably connected to the mobile automated guided vehicle, and configured to detect a predetermined characteristic of at least one pallet located in a stack of one or more pallets, wherein at least one sensing element of the sensor is mounted to the mobile automated guided vehicle so as to define a predetermined relation between the at least one sensing element and the pallet pick interface of the movable pallet pick, actuating the movable pallet pick in the pick direction to effect scanning of the stack of one or more pallets and detection, with the at least one sensing element, of the predetermined characteristic of the at least one pallet in the stack of one or more pallets;

registering, with a controller communicably connected to the at least one sensor, the detected predetermined characteristic of the at least one pallet from the scanning of the stack of one or more pallets;

determining, with the controller, from the registered predetermined characteristic that the at least one pallet is in a topmost pallet position of the stack of one or more pallets; and positioning, in the pick direction, the pallet pick interface of the movable pallet pick to interface the stack based on the determined topmost pallet position.

In accordance with one or more aspects of the disclosed embodiment the controller is configured to effect positioning of the pallet pick interface to interface and engage the at least one pallet in the topmost pallet position, and pick the at least one pallet off from the topmost pallet position.

In accordance with one or more aspects of the disclosed embodiment the controller is configured to effect positioning of the pallet pick interface to position the at least one pallet held by the pallet pick interface of the movable pallet pick onto the stack of one or more pallets in the topmost pallet position of the stack of one or more pallets.

In accordance with one or more aspects of the disclosed embodiment the at least one sensing element is disposed so as to move in the pick direction coincident with motion of the movable pallet pick in the pick direction, and detect the predetermined characteristic of the at least one pallet in the stack of one or more pallets independent of whether the movable pallet pick holds the at least one pallet thereon.

In accordance with one or more aspects of the disclosed embodiment the at least one sensing element is mounted to the movable pallet pick.

In accordance with one or more aspects of the disclosed embodiment the scanning of the stack of one or more pallets with at least one sensing element detects the predetermined characteristic of each pallet of the one or more pallets in the stack of one or more pallets.

In accordance with one or more aspects of the disclosed embodiment the predetermined characteristic is determinative of a seat interface of the at least one pallet, and the controller is configured to determine whether the seat interface is in a nominal condition so as to conform to stable engagement and stable seating of the pallet pick interface with the seat interface of the at least one pallet.

In accordance with one or more aspects of the disclosed embodiment the method further comprises determining, with the controller, whether the seat interface of the at least one pallet in the topmost position is accessible to the pallet pick interface.

In accordance with one or more aspects of the disclosed embodiment on determining inaccessibility of the seat interface of the at least one pallet in the topmost position, the controller is configured to determine at least another seat interface that is accessible, of another pallet stacked under the topmost pallet position, and effects positioning of the pallet pick interface to interface the at least another seat interface and pick the at least one pallet from the topmost pallet position from interface with the at least another seat interface.

In accordance with one or more aspects of the disclosed embodiment the at least another seat interface is adjacent to the at least one pallet in the topmost pallet position.

In accordance with one or more aspects of the disclosed embodiment the method further comprises determining, with the controller, a topmost accessible seat interface for the at least one pallet in the topmost position, wherein the topmost accessible seat interface is determined from the seat interface of the at least one pallet in the topmost position, or another seat interface of at least another pallet in a stack position supporting the at least one pallet in the topmost position.

In accordance with one or more aspects of the disclosed embodiment the at least one sensing element is at least one of a two-dimensional LIDAR sensor, a three-dimensional LIDAR sensor, an RGB camera, a depth camera, and a time-of-flight camera.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the invention.

What is claimed is:

1. A mobile automated guided vehicle pallet stacker and destacker system comprising:
    a mobile automated guided vehicle having a vehicle base and movable pallet pick with a pallet pick interface, the movable pallet pick being configured to move, relative to the vehicle base, in a lift direction so that the movable pallet pick interfaces with, engages, lifts a pallet, and stably holds the lifted pallet on the pallet pick;
    a sensor communicably connected to the mobile automated guided vehicle, and configured to detect a predetermined characteristic of at least one pallet located in a stack of one or more pallets, wherein at least one sensing element of the sensor is mounted to the mobile automated guided vehicle so as to define a predetermined relation between the at least one sensing element and the pallet pick interface of the movable pallet pick, wherein the at least one sensing element is disposed so that actuation of the movable pallet pick in the lift direction effects, in but one movement direction, scanning of the stack of one or more pallets and detection, with the at least one sensing element, of the predetermined characteristic of the at least one pallet in the stack of one or more pallets; and
    a controller communicably connected to the at least one sensor so as to register the detected predetermined characteristic of the at least one pallet from the scanning of the stack of one or more pallets with the sensor moved in the lift direction, and the controller is configured to:
    determine from the registered predetermined characteristic that the at least one pallet is in a topmost pallet position of the stack of one or more pallets, and
    position, in the lift direction based on the registered detected predetermined characteristic, the pallet pick interface of the movable pallet pick to interface the stack based on the determined topmost pallet position.

2. The mobile automated guided vehicle pallet stacker and destacker system of claim 1, wherein the controller is configured to effect positioning of the pallet pick interface to interface and engage the at least one pallet in the topmost pallet position, and pick the at least one pallet off from the topmost pallet position.

3. The mobile automated guided vehicle pallet stacker and destacker system of claim 1, wherein the controller is configured to effect positioning of the pallet pick interface to position the at least one pallet held by the pallet pick interface of the movable pallet pick onto the stack of one or more pallets in the topmost pallet position of the stack of one or more pallets.

4. The mobile automated guided vehicle pallet stacker and destacker system of claim 1, wherein the at least one sensing element is disposed so as to move in the lift direction coincident with motion of the movable pallet pick in the lift direction, and detect the predetermined characteristic of the at least one pallet in the stack of one or more pallets independent of whether the movable pallet pick holds the at least one pallet thereon.

5. The mobile automated guided vehicle pallet stacker and destacker system of claim 1, wherein the at least one sensing element is mounted to the movable pallet pick.

6. The mobile automated guided vehicle pallet stacker and destacker system of claim 1, wherein the scanning of the stack of one or more pallets with at least one sensing element detects the predetermined characteristic of each pallet of the one or more pallets in the stack of one or more pallets.

7. The mobile automated guided vehicle pallet stacker and destacker system of claim 1, wherein the predetermined characteristic is determinative of a seat interface of the at least one pallet, and the controller is configured to determine whether the seat interface is in a nominal condition so as to conform to stable engagement and stable seating of the pallet pick interface with the seat interface of the at least one pallet.

8. The mobile automated guided vehicle pallet stacker and destacker system of claim 7, wherein the controller is configured to determine whether the seat interface of the at least one pallet in the topmost position is accessible to the pallet pick interface.

9. The mobile automated guided vehicle pallet stacker and destacker system of claim 8, wherein on determining inaccessibility of the seat interface of the at least one pallet in the topmost position, the controller is configured to determine at least another seat interface that is accessible, of another pallet stacked under the topmost pallet position, and effects positioning of the pallet pick interface to interface the at least another seat interface and pick the at least one pallet from the topmost pallet position from interface with the at least another seat interface.

10. The mobile automated guided vehicle pallet stacker and destacker system of claim 9, wherein the at least another seat interface is adjacent to the at least one pallet in the topmost pallet position.

11. The mobile automated guided vehicle pallet stacker and destacker system of claim 7, wherein the controller is configured to determine a topmost accessible seat interface for the at least one pallet in the topmost position, wherein the topmost accessible seat interface is determined from the seat interface of the at least one pallet in the topmost position, or another seat interface of at least another pallet in a stack position supporting the at least one pallet in the topmost position.

12. The mobile automated guided vehicle pallet stacker and destacker system of claim 1, wherein the at least one sensing element is at least one of a two-dimensional LIDAR sensor, a three-dimensional LIDAR sensor, an RGB camera, a depth camera, and a time-of-flight camera.

13. A logistic facility management system comprising:
at least one mobile automated guided palletizer/depalletizer vehicle arranged for automated navigation throughout at least part of a facility surface, the at least one mobile automated guided palletizer/depalletizer vehicle having a vehicle base and movable pallet pick with a pallet pick interface, the movable pallet pick being configured to move bi-directionally relative to the vehicle base to lower and raise the pallet pick interface to interface with, engage, and pick a pallet and stably hold the picked pallet on the movable pallet pick;
a sensor communicably connected to the at least one mobile automated guided palletizer/depalletizer vehicle, and configured to detect a predetermined pallet stack at a dynamically variable location on the at least part of the facility surface, the predetermined pallet stack having one or more pallets;
wherein the sensor has at least one sensing element disposed on the at least one mobile automated guided palletizer/depalletizer vehicle in a predetermined relation with respect to the pallet pick interface so as to move as a unit with the movable pallet pick in at least a scanning direction, the scanning direction being in but one direction relative to the predetermined pallet stack with the at least one sensing element moved from a predetermined lower pallet to a predetermined higher pallet in the predetermined pallet stack; and
a controller communicably connected to the at least one sensing element to receive therefrom scan data of the predetermined pallet stack with the sensor moved in the but one direction, the controller being configured to determine from the scan data an accessible, for the pallet pick interface, seat interface at or between the predetermined lower pallet and the predetermined higher pallet in the predetermined pallet stack from which the predetermined higher pallet depends, and position, with the movement of the movable pallet pick in the direction scanning the predetermined pallet stack, the pallet pick interface to interface the predetermined pallet stack at the accessible seat interface.

14. The logistic facility management system of claim 13, wherein the predetermined higher pallet is a topmost pallet of the predetermined pallet stack.

15. The logistic facility management system of claim 13, wherein the predetermined lower pallet is located under the predetermined higher pallet in the predetermined pallet stack, or is a bottom pallet of the predetermined pallet stack.

16. The logistic facility management system of claim 13, wherein the predetermined lower pallet and the predetermined higher pallet are a common pallet.

17. The logistic facility management system of claim 13, wherein the accessible seat interface is disposed on the predetermined lower pallet, or on the predetermined higher pallet.

18. The logistic facility management system of claim 13, wherein the movable pallet pick picks the predetermined higher pallet from the accessible seat interface.

19. The logistic facility management system of claim 13, wherein the controller is configured to register pick off the pallet stack, by the movable pallet pick of the predetermined higher pallet from the accessible seat interface generating a remainder stack, and determine, from the scan data of the predetermined pallet stack, a position of a topmost pallet of the remainder stack, and a position of another accessible seat interface corresponding to the topmost pallet of the remainder stack, and communicate the position of the other accessible seat interface to the at least one mobile automated guided palletizer/depalletizer vehicle or another mobile automated guided palletizer/depalletizer vehicle for picking of the topmost pallet off the remainder stack from the other accessible seat interface.

20. A method for picking pallets from a pallet stack with a mobile automated guided vehicle pallet stacker and destacker system, the method comprising:
providing a mobile automated guided vehicle having a vehicle base and movable pallet pick with a pallet pick interface, the movable pallet pick being configured to move, relative to the vehicle base, in a lift direction so that the movable pallet pick interfaces with, engages, lifts a pallet, and stably holds the picked pallet on the pallet pick;
providing a sensor communicably connected to the mobile automated guided vehicle, and configured to detect a predetermined characteristic of at least one pallet located in a stack of one or more pallets, wherein at least one sensing element of the sensor is mounted to the mobile automated guided vehicle so as to define a predetermined relation between the at least one sensing element and the pallet pick interface of the movable pallet pick,
actuating the movable pallet pick in the lift direction to effect, in but one movement direction, scanning of the stack of one or more pallets and detection, with the at least one sensing element, of the predetermined characteristic of the at least one pallet in the stack of one or more pallets;
registering, with a controller communicably connected to the at least one sensor, the detected predetermined characteristic of the at least one pallet from the scanning of the stack of one or more pallets with the sensor moved in the lift direction;

determining, with the controller, from the registered predetermined characteristic that the at least one pallet is in a topmost pallet position of the stack of one or more pallets; and positioning, in the lift direction based on the registered detected predetermined characteristic, the pallet pick interface of the movable pallet pick to interface the stack based on the determined topmost pallet position.

21. The method of claim 20, wherein the controller is configured to effect positioning of the pallet pick interface to interface and engage the at least one pallet in the topmost pallet position, and pick the at least one pallet off from the topmost pallet position.

22. The method of claim 20, wherein the controller is configured to effect positioning of the pallet pick interface to position the at least one pallet held by the pallet pick interface of the movable pallet pick onto the stack of one or more pallets in the topmost pallet position of the stack of one or more pallets.

23. The method of claim 20, wherein the at least one sensing element is disposed so as to move in the lift direction coincident with motion of the movable pallet pick in the lift direction, and detect the predetermined characteristic of the at least one pallet in the stack of one or more pallets independent of whether the movable pallet pick holds the at least one pallet thereon.

24. The method of claim 20, wherein the at least one sensing element is mounted to the movable pallet pick.

25. The method of claim 20, wherein the scanning of the stack of one or more pallets with at least one sensing element detects the predetermined characteristic of each pallet of the one or more pallets in the stack of one or more pallets.

26. The method of claim 20, wherein the predetermined characteristic is determinative of a seat interface of the at least one pallet, and the controller is configured to determine whether the seat interface is in a nominal condition so as to conform to stable engagement and stable seating of the pallet pick interface with the seat interface of the at least one pallet.

27. The method of claim 26, further comprising determining, with the controller, whether the seat interface of the at least one pallet in the topmost position is accessible to the pallet pick interface.

28. The method of claim 27, wherein on determining inaccessibility of the seat interface of the at least one pallet in the topmost position, the controller is configured to determine at least another seat interface that is accessible, of another pallet stacked under the topmost pallet position, and effects positioning of the pallet pick interface to interface the at least another seat interface and pick the at least one pallet from the topmost pallet position from interface with the at least another seat interface.

29. The method of claim 28, wherein the at least another seat interface is adjacent to the at least one pallet in the topmost pallet position.

30. The method of claim 26, further comprising determining, with the controller, a topmost accessible seat interface for the at least one pallet in the topmost position, wherein the topmost accessible seat interface is determined from the seat interface of the at least one pallet in the topmost position, or another seat interface of at least another pallet in a stack position supporting the at least one pallet in the topmost position.

31. The method of claim 20, wherein the at least one sensing element is at least one of a two-dimensional LIDAR sensor, a three-dimensional LIDAR sensor, an RGB camera, a depth camera, and a time-of-flight camera.

* * * * *